United States Patent
Li et al.

(10) Patent No.: US 10,333,435 B2
(45) Date of Patent: Jun. 25, 2019

(54) MULTI-MOTOR CONTROLLER

(71) Applicant: Performance Motion Devices, Inc., Westford, MA (US)

(72) Inventors: Peng Li, Bolton, MA (US); Peter Fransiscus Vandermeulen, Newburyport, MA (US); Emanuel Gustav Lewin, Lincoln, MA (US); David Chanan Horovitch Shmelzer, Wayland, MA (US); Ahmad Radey Shouman, Chelmsford, MA (US)

(73) Assignee: Performance Motion Devices, Inc., Westford, MA (US)

( * ) Notice: Subject to any disclaimer, the term of this patent is extended or adjusted under 35 U.S.C. 154(b) by 0 days.

(21) Appl. No.: 15/900,959

(22) Filed: Feb. 21, 2018

(65) Prior Publication Data

US 2018/0241324 A1    Aug. 23, 2018

Related U.S. Application Data

(60) Provisional application No. 62/462,134, filed on Feb. 22, 2017.

(51) Int. Cl.
| | | |
|---|---|---|
| *H02K 33/00* | (2006.01) | |
| *H02P 5/00* | (2016.01) | |
| *H02P 23/14* | (2006.01) | |
| *H02P 27/00* | (2006.01) | |

(52) U.S. Cl.
CPC ............... *H02P 5/00* (2013.01); *H02P 23/14* (2013.01); *H02P 27/00* (2013.01)

(58) Field of Classification Search
CPC ................................ H02N 2/0075; H02P 5/00
See application file for complete search history.

(56) References Cited

U.S. PATENT DOCUMENTS

| | | | |
|---|---|---|---|
| 4,779,031 A | 10/1988 | Arends et al. | |
| 4,893,068 A | 1/1990 | Evans, Jr. | |
| 5,734,528 A * | 3/1998 | Jabbari | ................ G11B 5/5521 360/264.2 |
| 6,191,507 B1 | 2/2001 | Peltier et al. | |

(Continued)

OTHER PUBLICATIONS

Servo-Halbeck Press Release, Integrated Motion Controllers, servo-Halbeck GmbH & Co.KG, pp. 1-2, [retrieved on Sep. 11, 2006]. Retrieved from the Internet URL: HTTP://www.servo-halbeck.com/html/integrated_mcs.html.

(Continued)

*Primary Examiner* — Karen Masih
(74) *Attorney, Agent, or Firm* — Hamilton, Brook, Smith & Reynolds, P.C.

(57) ABSTRACT

A motor control module provides control of a plurality of different motor types, such as a 1-phase DC Brush motor, a 3-phase brushless DC motor, and a 2-phase step motor. The module includes a digital amplifier that is configurable to drive the plurality of different motor types. A motor control unit, coupled to the digital amplifier, controls a motor type driven by the digital amplifier via a command signal to the digital amplifier. The motor control unit also monitors status information about the motor control module, including status information about the digital amplifier. A motor coil interface is coupled to the digital amplifier and configured to connect with the plurality of different motor types.

34 Claims, 17 Drawing Sheets

(56) References Cited

U.S. PATENT DOCUMENTS

| | | |
|---|---|---|
| 6,211,639 B1 | 4/2001 | Meister et al. |
| 6,653,810 B2 | 11/2003 | Lo |
| 6,865,441 B2 | 3/2005 | Chandhoke |
| 6,888,469 B2 | 5/2005 | Seferian |
| 6,943,521 B2 | 9/2005 | Kurokawa et al. |
| 6,989,642 B2 | 1/2006 | Wakefield, II et al. |
| 7,024,257 B2 | 4/2006 | Pearce et al. |
| 7,064,513 B2 | 6/2006 | Fenley |
| 7,194,321 B2 | 3/2007 | Sun et al. |
| 7,259,470 B2 | 8/2007 | Matsuoka |
| 7,397,363 B2 | 7/2008 | Joao |
| 7,719,214 B2 | 5/2010 | Leehey et al. |
| 2003/0006749 A1 | 1/2003 | Rollman |
| 2008/0074075 A1 | 3/2008 | Davis et al. |
| 2014/0352459 A1* | 12/2014 | Matsuzawa .......... H02N 2/0075 73/865.8 |

OTHER PUBLICATIONS

"New All-Digital Motion Module Delivers Advanced Features," Press Release of Performance Motion Devices, Inc., 1 pg. (Aug. 1, 2005).

"Megellan Motion Controllers," Performance Motion Devices, Inc., 4 pgs. (2004).

"The Magellan Family of Motion Processors," Performance Motion Devices, Inc., 4 pgs. (2005).

"Magellan Motion Processor User's Guide for MC55000 & MC 58000 Series Motion Processors," Performance Motion Devices, Inc., 115 pgs, (2003).

"PD&D Exclusive, All-Digital Motion Module," Product Design & Development, 2 pgs. (Sep. 2005).

\* cited by examiner

| | DC BRUSH MOTOR EXCITATION ⟵1001 | | | | | | | | | | |
|---|---|---|---|---|---|---|---|---|---|---|---|
| | SWITCH CONTROL | | | | | | | | CURRENT INPUT | | | |
| | AHIGH | ALOW | BHIGH | BLOW | CHIGH | CLOW | DHIGH | DLOW | A | B | C | D |
| POS VOLTAGE/ TORQUE | CLOSED | OPEN | OPEN | CLOSED | OPEN | OPEN | OPEN | OPEN | | USED | NOT USED | NOT USED |
| NEG VOLTAGE/ TORQUE | OPEN | CLOSED | CLOSED | OPEN | OPEN | OPEN | OPEN | OPEN | USED | | NOT USED | NOT USED |

FIG. 10A

3-PHASE BRUSHLESS DC MOTOR EXCITATION (HALL-BASED COMMUTATION)

1002

| | HALL STATE | | | | SWITCH CONTROL | | | | | | | | CURRENT INPUT | | | |
|---|---|---|---|---|---|---|---|---|---|---|---|---|---|---|---|---|
| | A | B | C | PHASE ANGLE | AHIGH | ALOW | BHIGH | BLOW | CHIGH | CLOW | DHIGH | DLOW | A | B | C | D |
| V+/ TORQUE+ | 1 | 0 | 0 | 120 | OPEN | CLOSED | OPEN | OPEN | CLOSED | OPEN | OPEN | OPEN | USED | | | N/U |
| | 1 | 1 | 0 | 180 | OPEN | OPEN | OPEN | CLOSED | CLOSED | OPEN | OPEN | OPEN | | USED | | N/U |
| | 0 | 1 | 0 | 240 | CLOSED | OPEN | OPEN | CLOSED | OPEN | OPEN | OPEN | OPEN | | USED | | N/U |
| | 0 | 1 | 1 | 300 | CLOSED | OPEN | OPEN | OPEN | OPEN | CLOSED | OPEN | OPEN | | | USED | N/U |
| | 0 | 0 | 1 | 0 | OPEN | OPEN | CLOSED | OPEN | OPEN | CLOSED | OPEN | OPEN | | | USED | N/U |
| | 1 | 0 | 1 | 60 | OPEN | CLOSED | CLOSED | OPEN | OPEN | OPEN | OPEN | OPEN | USED | | | N/U |
| V-/ TORQUE- | 1 | 0 | 0 | 120 | CLOSED | OPEN | OPEN | OPEN | OPEN | CLOSED | OPEN | OPEN | USED | | | N/U |
| | 1 | 1 | 0 | 180 | OPEN | OPEN | OPEN | CLOSED | OPEN | CLOSED | OPEN | OPEN | | USED | | N/U |
| | 0 | 1 | 0 | 240 | OPEN | CLOSED | CLOSED | OPEN | OPEN | OPEN | OPEN | OPEN | | USED | | N/U |
| | 0 | 1 | 1 | 300 | OPEN | CLOSED | OPEN | OPEN | CLOSED | OPEN | OPEN | OPEN | | | USED | N/U |
| | 0 | 0 | 1 | 0 | OPEN | OPEN | OPEN | CLOSED | CLOSED | OPEN | OPEN | OPEN | | | USED | N/U |
| | 1 | 0 | 1 | 60 | CLOSED | OPEN | OPEN | CLOSED | OPEN | OPEN | OPEN | OPEN | USED | | | N/U |

FIG. 10B

2-PHASE STEP MOTOR EXCITATION ↙ 1003

| PHASE ANGLE (deg) | SWITCH CONTROL | | | | | | | | CURRENT INPUT | | | |
|---|---|---|---|---|---|---|---|---|---|---|---|---|
| | AHIGH | ALOW | BHIGH | BLOW | CHIGH | CLOW | DHIGH | DLOW | A | B | C | D |
| 0 | OPEN | OPEN | OPEN | OPEN | CLOSED | OPEN | OPEN | CLOSED | | | | |
| 45 | OPEN | CLOSED | CLOSED | OPEN | CLOSED | OPEN | OPEN | CLOSED | USED | | | USED |
| 90 | OPEN | CLOSED | CLOSED | OPEN | OPEN | OPEN | OPEN | CLOSED | USED | | | USED |
| 135 | OPEN | CLOSED | CLOSED | OPEN | OPEN | CLOSED | CLOSED | OPEN | USED | | | |
| 180 | OPEN | OPEN | OPEN | OPEN | OPEN | CLOSED | CLOSED | OPEN | | | | |
| 225 | CLOSED | OPEN | OPEN | CLOSED | OPEN | CLOSED | CLOSED | OPEN | | USED | USED | |
| 270 | CLOSED | OPEN | OPEN | CLOSED | OPEN | OPEN | OPEN | OPEN | | USED | USED | |
| 315 | CLOSED | OPEN | OPEN | CLOSED | CLOSED | OPEN | OPEN | CLOSED | | USED | USED | USED |

FIG. 10C

MULTI-MOTOR CONTROLLER

RELATED APPLICATION

This application claims the benefit of U.S. Provisional Application No. 62/462,134, filed on Feb. 22, 2017. The entire teachings of the above application are incorporated herein by reference.

BACKGROUND

A typical motor control system includes a host processor, motion controller, motor drive, and motor. The motion controller may accept commands over a network, such as position, velocity, acceleration, and jerk, from the host processor and generate a corresponding trajectory. The motor drive, in turn, provides an appropriate power signal to drive the motor according to the generated trajectory. Typically, the motion controller and the motor drive are designed differently for different motor types.

SUMMARY

Example embodiments described herein include a motor control module configurable to control a plurality of different motor types. The motor control module may include a digital amplifier, a motor control unit, and a motor coil interface. The digital amplifier may be configured to drive the plurality of different motor types. The motor control unit may be coupled to the digital amplifier and configured to control a motor type driven by the digital amplifier via a command signal to the digital amplifier. The motor control unit may also monitor status information about the motor control module, including status information about the digital amplifier. The motor coil interface may be coupled to the digital amplifier and configured to connect with the plurality of different motor types.

In further embodiments, the plurality of different motor types can include at least two of a 1-phase motor, a 2-phase motor, and a 3-phase motor. For example, the plurality of different motor types may include a 1-phase DC Brush motor, a 3-phase brushless DC motor, and a 2-phase step motor. The motor coil interface may be configured to connect with the plurality of different motor types via at least one common port. The digital amplifier may be further configured to selectively enable and disable at least one output to the motor coil interface based on the motor type.

In still further embodiments, the digital amplifier may include a current loop that is reconfigurable as a function of the motor type. The current loop may be reconfigured via an excitation table, which can be stored at (or accessible to) the digital amplifier. The digital amplifier and/or motor control unit may be configured to modify the excitation table via a programming signal received from a host. Such modification may be implemented by a user to program the motor control module for customized operation or for operation with a motor not adapted for existing excitation tables. The current loop may also be configured to calculate a return current from the motor via a process common to the plurality of different motor types.

In yet further embodiments, the digital amplifier may include a set of traces extending to the motor coil interface. The set of traces may be configured to carry drive signals for the plurality of different motor types, and may be aligned in a common path and positioned within a proximity that reduces electromagnetic interference among the traces.

In further embodiments, the motor control unit may forward motor control commands to the digital amplifier. The motor control commands may have a format independent of motor type, the digital amplifier being further configured to control a motor of the selected motor type based on the motor control commands. The module may also include a motor type register accessible by the digital amplifier, the motor type register being configured to store an indication of the motor type. The digital amplifier may be further configured to generate a pulse-width modulation (PWM) signal to the motor coil interface, the digital amplifier controlling a duty cycle of the PWM signal based on a motor control command received from the motor control unit.

In still further embodiments, the motor control unit may also include status registers connected to the motor control unit. The status registers may be configured in a format independent of motor type, and may include status information that is updated by the motor control unit. The status registers may be pre-programmed during a setup mode and read during an operating mode. The status registers may include a drive status register, the drive status register indicating the status information about the digital amplifier. The status information about the digital amplifier includes a voltage input to the digital amplifier, temperature of the digital amplifier, and current output by the digital amplifier. The status information may also include status information about a current control loop coupled to the digital amplifier. The status information about the current control loop may include a commanded current, measured current, difference between the commanded and measured currents, sum of an integrator of the current control loop, overall contribution of the integrator, and output command for the current control loop. The status registers may include an event status register, activity status register, and signal status register. The motor control unit may further include a processing unit coupled to the digital amplifier and the status registers, the processing unit configured to update the status registers. The status registers may also include an event status register, the motor control unit configured to clear at least one bit in the event status register based on a message from a host processor in communication with the motor control module.

Further embodiments include a method of controlling a motor. A motor type driven by a digital amplifier may be selected via a command signal to the digital amplifier, the digital amplifier being configured to drive a plurality of different motor types. The digital amplifier is configured to drive a motor of the motor type in accordance with the command signal. Status information about a motor control module may be monitored via a motor control unit, where the status information includes status information about the digital amplifier. The motor is driven via a motor coil interface coupled to the digital amplifier, the motor coil interface configured to connect with the plurality of different motor types. Methods in further embodiments may include one or more of the features described above.

Still further embodiments may include a motor control system comprising plural motor control modules and a motor control data bus for carrying motor information. The plural motor control modules may be coupled to the motor control data bus, each motor control module including a digital amplifier, a motor control unit, and a motor coil interface. The digital amplifier may be configured to drive the plurality of different motor types. The motor control unit may be coupled to the digital amplifier and configured to control a motor type driven by the digital amplifier via a command signal to the digital amplifier. The motor control unit may also monitor status information about the motor control module, including status information about the digital amplifier. The motor coil interface may be coupled to the digital amplifier and configured to connect with the plurality of different motor types. The plural modules may each include one or more features of the embodiments described above. The system may also include a host controller coupled to the plural motor control modules via the motor control data bus, the host controller being configured to retrieve the common status information by sending a message to the plural motor control modules.

Further embodiments may include a motor control device comprising a digital amplifier and a motor coil. The digital amplifier may be configured to drive a plurality of different motor types. The digital amplifier, in response to a command signal received from a motor control unit indicating a selected motor type, may enter a mode of operation corresponding to the selected motor type, the mode of operation being one of plural modes of operation each corresponding to a different motor type. The motor coil interface may be coupled to the digital amplifier, the motor coil interface being configured to connect with the plurality of different motor types. The digital amplifier may reconfigure outputs of the motor coil interface based on the mode of operation.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 10A-C are example excitation tables for controlling different motor types.

DETAILED DESCRIPTION

Figure 1:
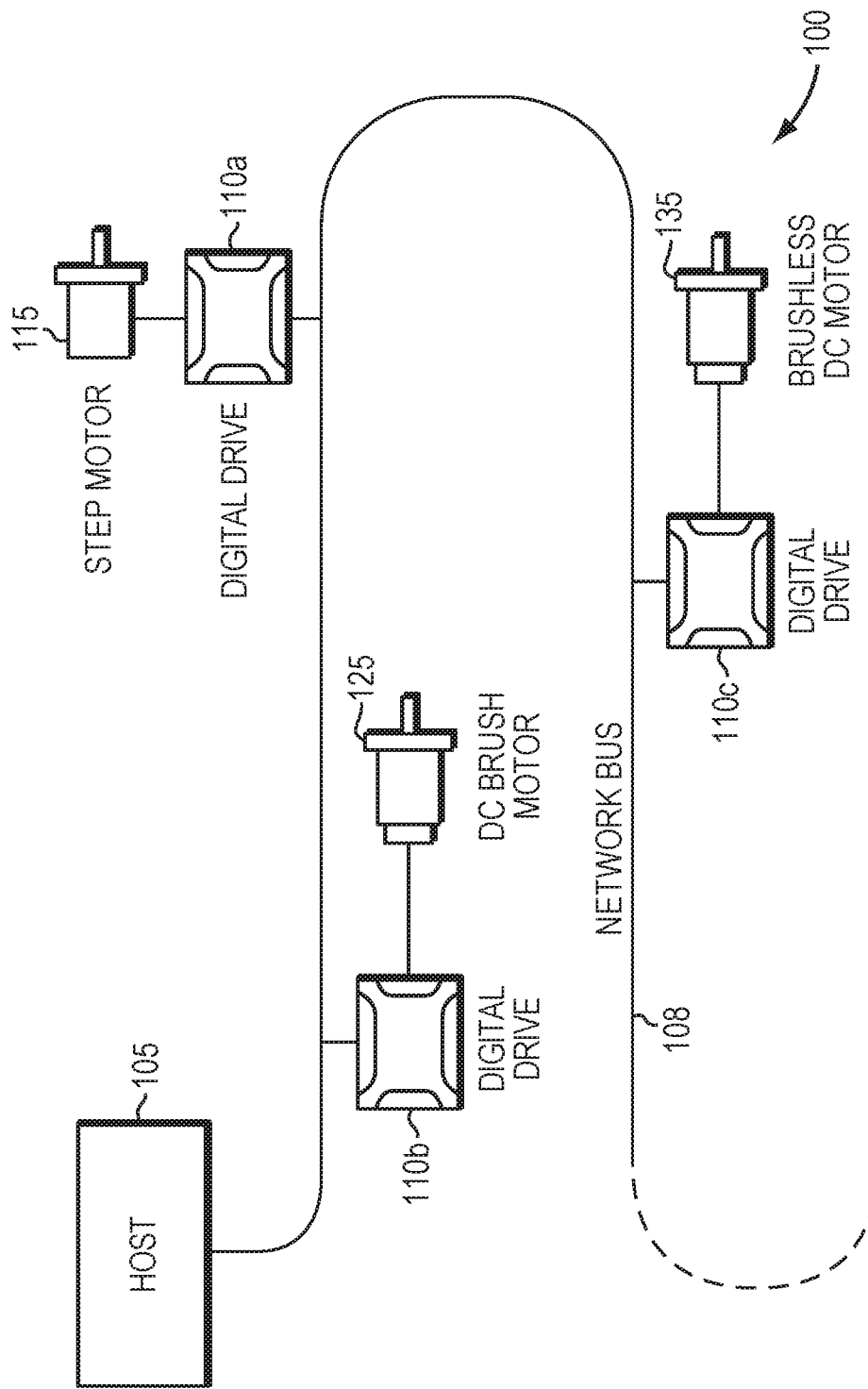
FIG. 1 is a block diagram of a motor control system in an example embodiment.

A description of example embodiments follows. The teachings of all patents, published applications and references cited herein are incorporated by reference in their entirety.

In medical, scientific, semiconductor, automation, industrial, and robotic applications, a motor control system may utilize multiple motors of varying types. In any particular application, the system designer determines the appropriate motion controllers and motor drives to use for the different motor types. The system designer then configures each of the motion controllers in a particular way depending on the motor type which it controls. Thus, in typical motor control systems, the controlling and monitoring functions of the motion controller are specific to the motor type which it controls.

Example embodiments described herein provide control of motors of different types in a uniform manner via motors controllers adaptable for use with the different motor types. Example embodiments include a digital amplifier that provides capability for a multi-motor module, which can drive multiple motor types without hardware modification. The digital amplifier enables the module, in response to a received signal (e.g., external electrical command) to drive a selected one of a number of motor types, such as a DC Brush motor, a 3-phase brushless DC motor, and a two-phase step motor.

Software-controlled selection of motor type in a motor control system can provide substantial benefits. For example, in control systems that may connect to more than one motor type, software-controlled selection provides a low-cost solution relative to hardware reconfiguration or redesign. A digital motor drive in example embodiments enables creation of a motion control system that may be connected to one of the motor types indicated above, as well as other motor types, without advance configuration of the system or inclusion of special electronics. Such a feature results in greater economies of scale of a multi-motor controller unit, as well as reduction of inventory costs as a result of providing a controller unit that is suitable to control several different types of motors. Further, repair of motor controllers may be simplified, where only a single controller type is needed (rather than one for each motor type), reducing stocking costs and technical repair complexity.

Example embodiments may include a number of features that enable motor type selection in a motor control system. For example, embodiments may provide a control and communications system that enables the control and monitoring of various motor types through common registers and command protocols on the same network signaling. An example of such a system is described in U.S. Pat. No. 7,719,214 B2, the entirety of which is incorporated herein by reference. A Serial Peripheral Interconnect (SPI) interface or other network protocol may be used to effect a control and communications network. A SPI-based network allows one or more controller units to be connected to a common signaling network such that a host can command motor control functions for each motor axis, as well as with various motor types controllable through the network as described in the network.

In further embodiments, multi-motor controller units can be intermingled with motor-specific controller units. From the perspective of the host controller, a motor controller that is dedicated to controlling a certain motor type may be controlled identically by the host controller as a multi-motor controller that has been electrically programmed (via the SPI network or in non-volatile memory) to control a certain motor type. Other than initially setting the motor type for network-connected multi-motor controller units, the host may not need to distinguish motor-dedicated controller units from multi-motor controller units. Once the motor type is set, the communications and control methods may be identical.

Digital amplifiers in example embodiments may primarily provide torque (current) control of the motor types indicated above. However, embodiments may be extended to other types of network-connected motor control functions, including those that control the motor velocity and the motor position. In addition, beyond the motor types indicated above, a multi-motor control module in further embodiments may be configured to control other motor types, such as piezo motors, voice coil, solenoids, or AC induction motors.

FIG. 1 is a block diagram of an example embodiment of a motor control system 100 employing motors of different types. In the example configuration shown, the motor control system 100 employs a step motor 115, a DC brush motor 125, and a brushless DC motor 135. The motor control system 100 may employ the same or other motors in different quantities and combinations. The step motor 115, DC brush motor 125, and brushless DC motor are connected to and controlled by respective motor control modules 110a-c. The motor control modules 110a-c, in turn, may connect to and communicate with a host processor 105 over a motor control data bus 108. The motor control data bus 108 may be any compatible distributed network bus configured in serial or parallel, such as an SPI network, a Controller Area Network (CAN) data bus, or an Ethernet bus.

Figure 2:
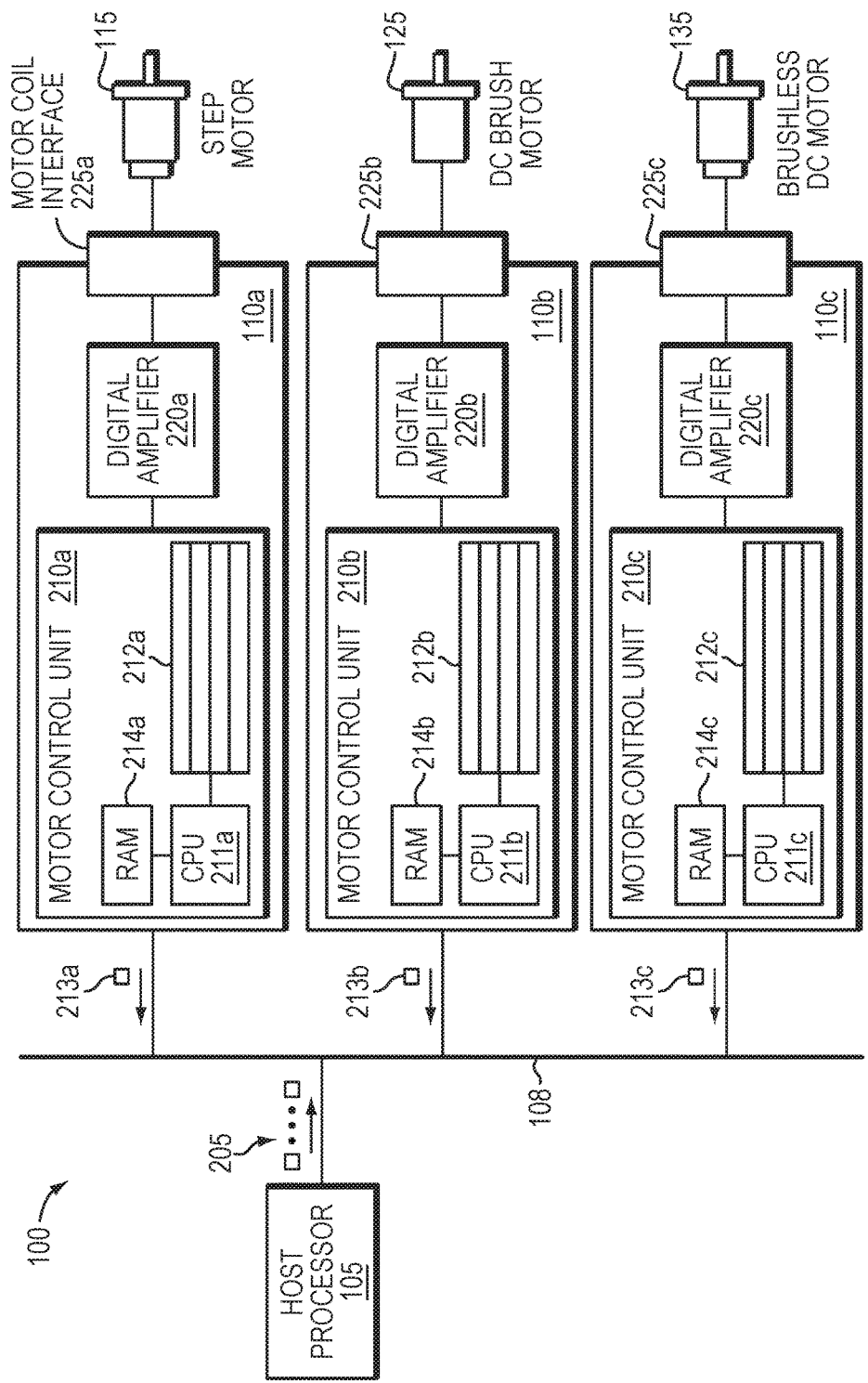
FIG. 2 is a block diagram of the motor control system illustrating the motor control modules in further detail.

FIG. 2 illustrates the motor control system 100 in further detail. The motor control modules 110a-c may include identical or substantially similar hardware components, yet are configured (via a programmed configuration) to drive motors of different motor types. In particular, motor control module 110a is configured to drive the step motor 115, motor control module 110b is configured to drive the DC brush motor 125, and motor control module 110c is configured to drive the brushless DC motor 135.

The motor control modules 110a-c include respective motor control units 210a-c, digital amplifiers 220a-c, and motor coil interfaces 225a-c. The motor control units 210a-c provide motion commands to the respective digital amplifiers 220a-c. Each motor control unit 210a-c includes respective processors 211a-c, banks of status registers 212a-c, and memory, such as random access memory (RAM) 214a-c. The RAM 214a-c may be non-volatile random access memory (NVRAM).

The digital amplifiers 220a-c may each be enabled to drive a plurality of different motor types. Likewise, the motor coil interfaces 225a-c provide a connective interface between the motor control modules 110a-c and the motors 115, 125, 135, and each include ports enabling connection with the plurality of different motor types. The motor control units 210a-c may select and program a motor type to be driven by the digital amplifiers 220a-c via a command signal to the digital amplifier 220a-c. In response to the command signal, each of the digital amplifiers 220a-c may enter a programmed configuration to drive the selected motor type, thereby transitioning to a motor-specific motor driver. For example, digital amplifier 220a, upon receiving a command from the motor control unit 210a indicating selection of a step motor type, enters a programmed configuration to drive the step motor 115. The digital amplifier 220a may store an indication of the motor type to a register at (or accessible to) the digital amplifier 220a. If the motor control module 110a is later employed to drive a motor of a different type, then the configuration process may be repeated to accommodate the subsequent motor. The motor coil interface 225a includes ports to connect with the step motor 115, and may employ the same ports, or a selected subset of the ports, to connect with the subsequent motor. The digital amplifier 220a may configure and reconfigure the outputs to the motor coil interface 225a to accommodate a given motor type.

The digital amplifiers 220a-c may implement Pulse Width Modulation (PWM) or Digital-to-Analog Conversion (DAC) signals to control single-phase (e.g., DC brush) and multi-phase motors (e.g., brushless DC, step motors). Depending on the waveform and the motor output mode selected (PWM or DAC), either two or three output signals per axis can be provided by the motor coil interfaces 225a-c. For DC brush motors, which are single phase devices, each PWM or analog output may drive the motor's single coil. For multi-phase motors, motor control may differ depending on whether a PWM or analog output mode has been chosen.

The respective banks of status registers 212a-c include status information about the motor control modules 110a-c that is monitored by the respective processors 211a-c. The contents of the banks of status registers 212a-c may be used in breakpoint operations to define a triggering event, such as when a change in a status register is detected. The status registers 212a-c may also be the source of data for mechanisms to output one or more bits within the registers 212a-c. The host processor 105 may query the banks of status registers 212a-c for specific status information in common among the motor control modules 110a-c for the different motor types. For example, the host processor 105 may send messages 205 to the motor control modules 110a-c requesting the specific status information contained in the banks of status registers 212a-c. In reply, the processors 211a-c may access the banks of status registers 212a-c and provide respective messages 213a-c to the host processor 105 that include the requested status information.

Entries stored in the banks of status registers 212a-c can include status information that is in common among the motor control modules 110a-c, regardless of the different types of motors 115, 125, 135 and configuration of the digital amplifiers 220a-c. Thus, a system designer can design a motor control system with very little consideration of the different motor types in the motor control system. For example, a system designer may simply purchase the appropriate motor control modules for the different motor types in the motor control system, update settings in the RAM 214a-c according to a protocol that is common across different motor types, and set up communications between the motor control modules 110a-c and the host processor. A system operator may then use the host processor 105 to access and read the status information in the banks of status registers 212a-c by sending, in some embodiments, identical messages 205 to the motor control modules 110a-c to request common status information without regard for the different motor types on the motor control system.

Figure 3A:
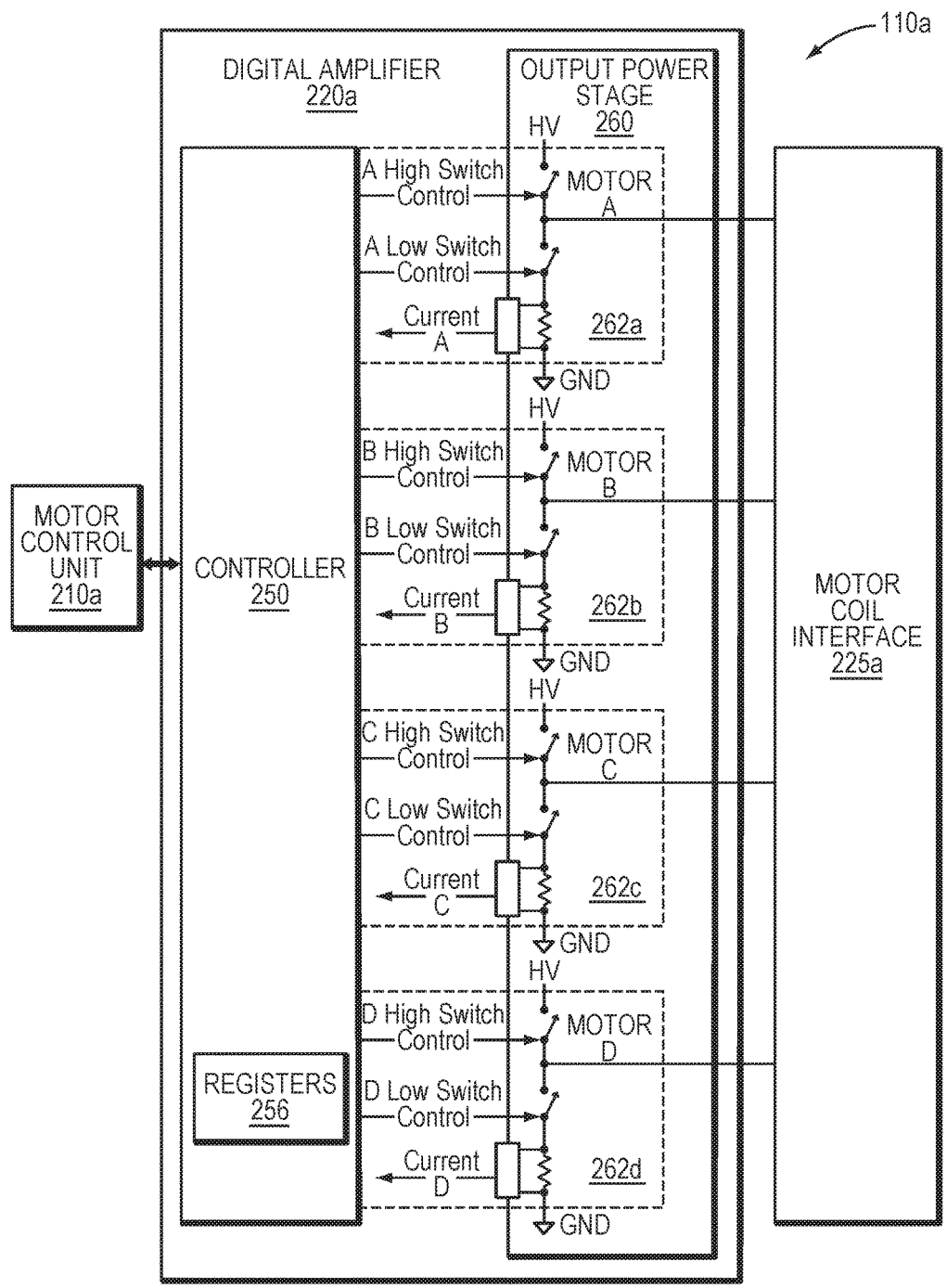
FIGS. 3A and 3B illustrate a motor control module including a digital amplifier in an example embodiment.

FIG. 3A is a diagram of the motor control module 110a illustrating the digital amplifier 220a in further detail. Each of the motor control modules 110a-c may include the same or similar features as shown in FIG. 3A. The digital amplifier 220a includes a controller 250 and an output power stage 260. The output power stage 260 includes a plurality of output circuits 262a-d, each of which controls a respective output (MOTOR A through MOTOR D) to the motor coil interface 225a. The output circuits 262a-d may each include a pair of switches ("high" and "low") connected in series between a voltage source and ground, where the switches are controlled by the controller 250. The output circuits 262a-d may also include a current detector (e.g., including a resistor in series with the switches) for reporting a measured current through the circuits 262a-d to the controller 250. During operation to control a motor, the controller 250 receives motor control commands from the motor control unit 210a. In accordance with the motor type configuration, the controller 250 generates motor excitation signals corresponding to the motor control commands, where the motor excitation signals operate the output circuits 262a-d (via the respective switches) to generate the motor outputs A-D. Depending on the motor type, the controller may generate outputs at all or a subset of the motor outputs A-D, switching unused outputs to an off (or high impedance) state.

During initial setup, the motor control unit 210a may receive an indication of a selected motor type from a host processor (e.g., host 105 of FIG. 2), and forwards a corresponding command signal to the digital amplifier 220a. Alternatively, the motor control module 110a may be receive an indication of selected motor type by other means, such as a command signal from another external source, an indication from the motor itself, or via a manual switch or other interface at the motor control module 110a. In response to the command signal, the digital amplifier 220a may enter a programmed configuration to drive the selected motor type. The digital amplifier 220a may store an indication of the motor type to registers 256. If the motor control module 110a is later employed to drive a motor of a different type, then the configuration process may be repeated to accommodate the subsequent motor, and the registers 256 may be updated accordingly. The motor coil interface 225a includes ports to connect with the step motor 115, and may employ the same ports, or a common subset of the ports, to connect with the subsequent motor. The digital amplifier 220a may configure and reconfigure the outputs to the motor coil interface 225a to accommodate a given motor type.

Figure 3B:
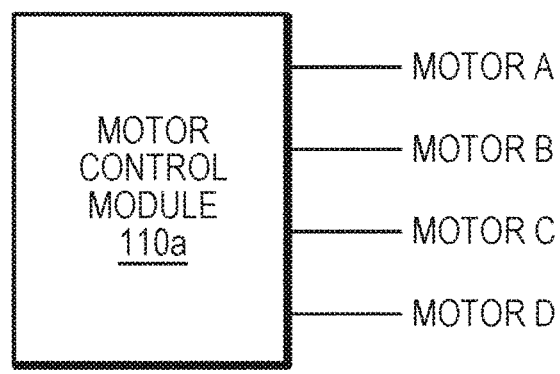

FIG. 3B is a simplified block diagram of the motor control module 110a of FIG. 3A, illustrating the motor outputs A-D for connection with a motor. The motor outputs A-D may be implemented in different configurations to connect with motors of different types. A motor of a given type may employ all of the motor outputs A-D (e.g., a 2-phase step motor), while motors of other types may employ a subset of the motor outputs (e.g., a DC brush motor or a DC brushless motor). The motor control module 110a may present the motor outputs A-D as a single, multi-motor port that accommodates one or more connector types for different motors. Alternatively, the motor control module 110a may present the motor outputs A-D as multiple different ports to accommodate a plurality of different connector types, and may extend the motor outputs A-D to multiple ports as required by each connector type. Although the plurality of different motor types may be alternatively connected to the same outputs, the motor control module 110a generates different drive signals to those outputs depending on motor type, as described above, to accurately drive the motor connected to the module 110a. Example connection configurations are described in further detail below with reference to FIGS. 4A-C. In addition to the configurations described below, a motor control module in further embodiments may be configured to control other motor types, such as piezo motors, voice coil, solenoids, or AC induction motors.

Figure 4A:
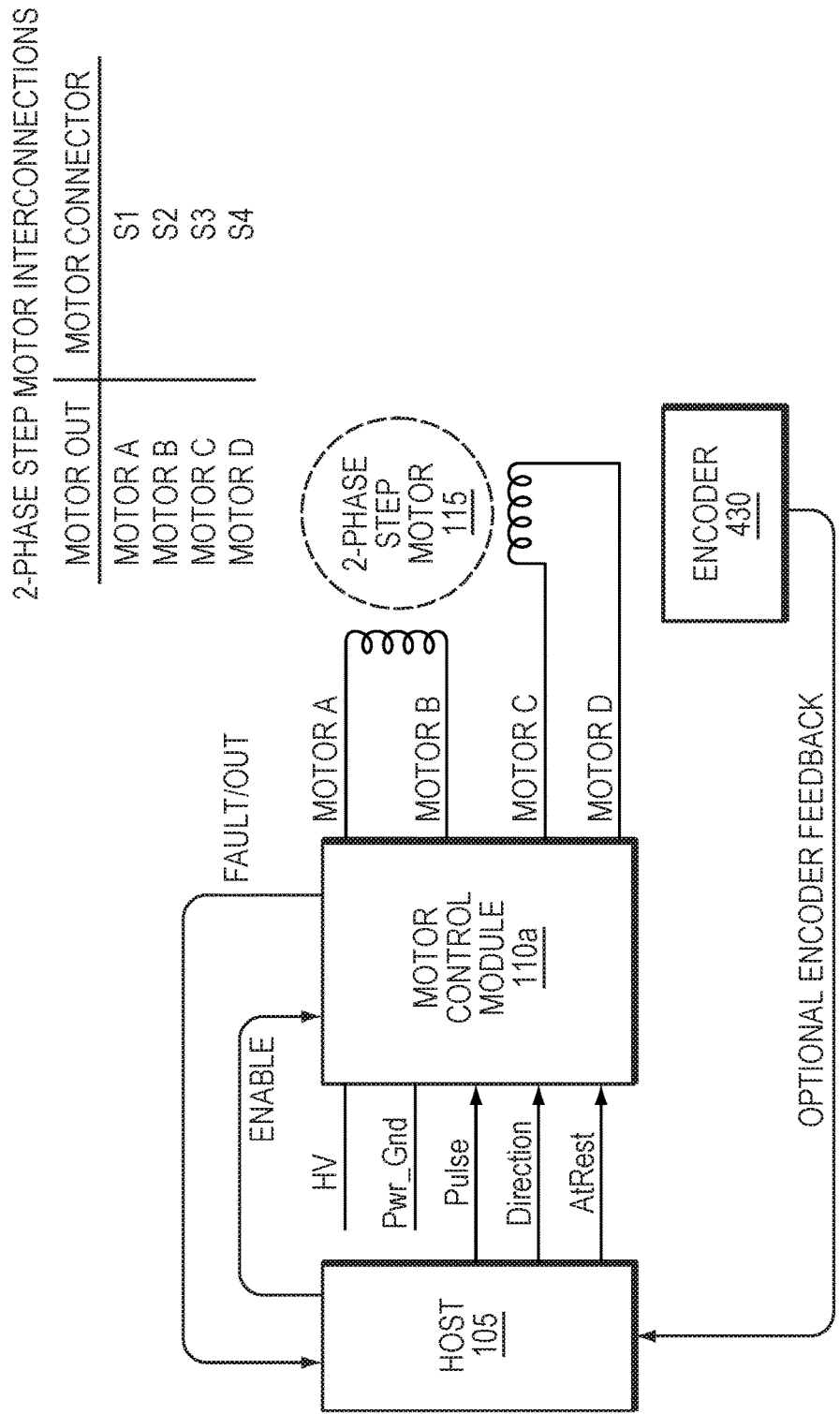
FIG. 4A is a block diagram of a motor control module configured to drive a 2-phase step motor in an example embodiment.

FIG. 4A is a block diagram of the motor control module 110a configured to drive the 2-phase step motor 115 in an example embodiment. The step motor 115 may include 4 input connections, S1-S4, where S1 and S2 connect across a first phase coil, and S3 and S4 connect across a second phase coil. The host 105 provides step motor commands (e.g., pulse, direction, rest) via a SPI or other communication interface, and the motor control module 110a interprets those signals to generate corresponding motor excitation signals at motor outputs A-D, thereby controlling both phases of the step motor 115 according to the step motor commands. Optionally, an encoder 430 may be implemented to measure the position of the motor 115 and provide that measurement as feedback to either the host 105, the motor control module 110a, or both.

Figure 4B:
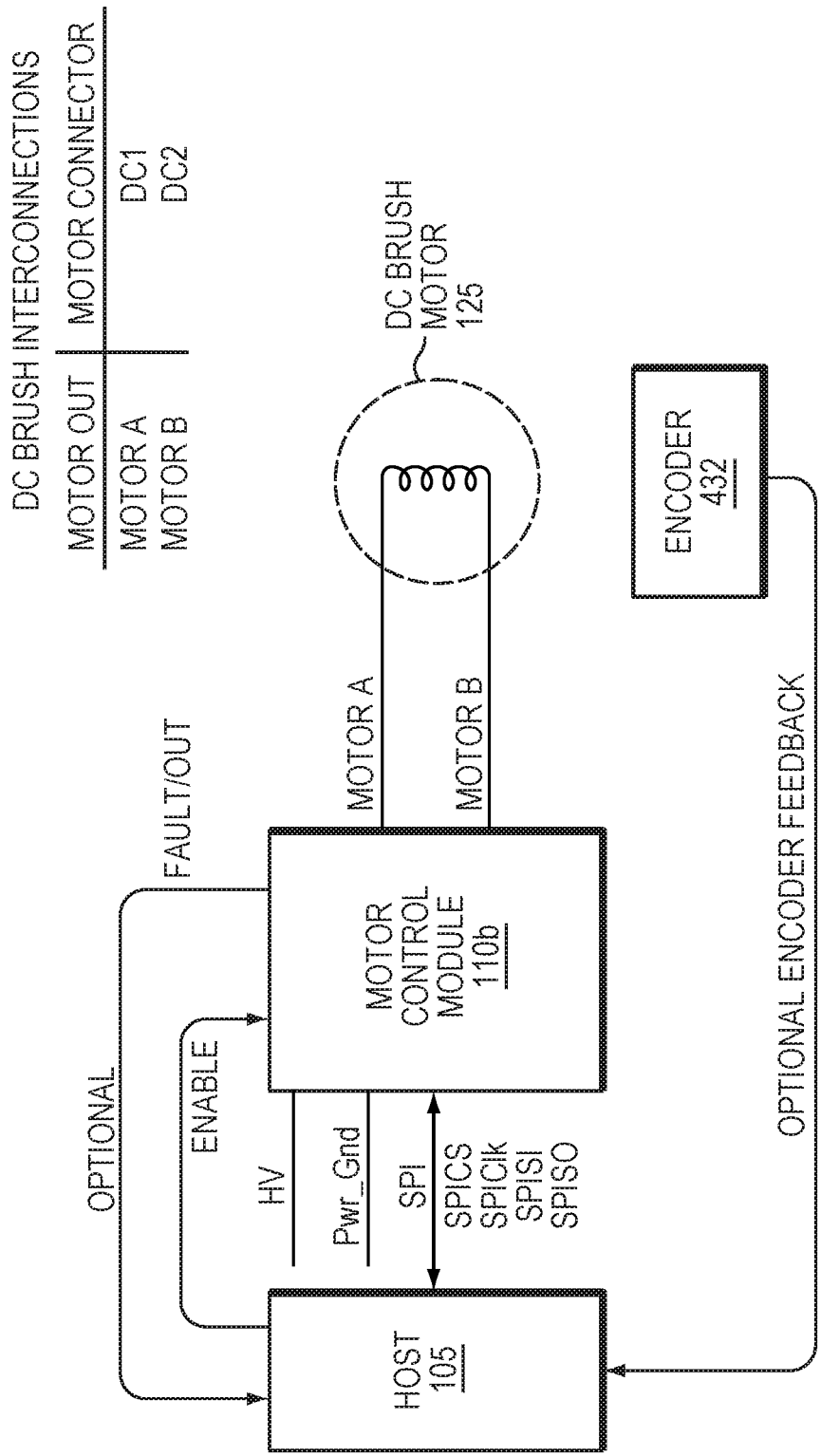
FIG. 4B is a block diagram of a motor control module configured to drive a DC brush motor in an example embodiment.

FIG. 4B is a block diagram of a motor control module 110b configured to drive a DC brush motor 125 in an example embodiment. The DC brush motor 125 may include 2 input connections, DC1 and DC2, that connect across a single phase coil. The host 105 provides motor commands (e.g., velocity and/or torque) via a SPI or other communication interface, and the motor control module 110a interprets those signals to generate corresponding motor excitation signals at motor outputs A and B, thereby controlling the DC brush motor 125 according to the motor commands. Optionally, an encoder 432 may be implemented to measure the position and/or velocity of the motor 125 and provides that measurement as feedback to either the host 105, the motor control module 110b, or both.

Figure 4C:
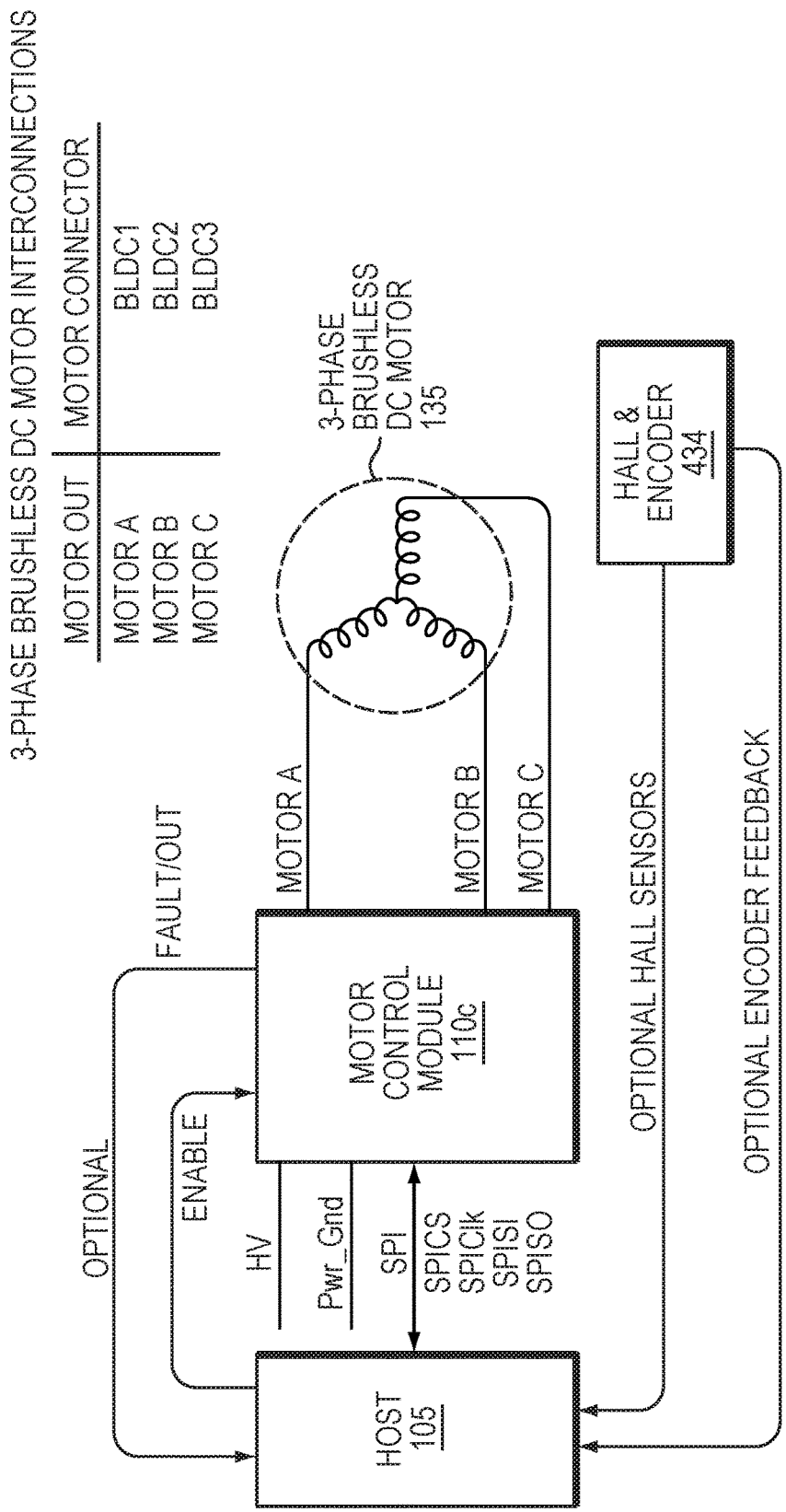
FIG. 4C is a block diagram of a motor control module configured to drive a 3-phase brushless DC motor in an example embodiment.

FIG. 4C is a block diagram of a motor control module 110c configured to drive a 3-phase brushless DC motor 135 in an example embodiment. The motor 135 may include 3 input connections, BLDC1-BLDC3, where each of the inputs connect to a respective phase coil. The host 105 provides motor commands (e.g., velocity and/or torque), and the motor control module 110c interprets those signals to generate corresponding motor excitation signals at motor outputs A-C, thereby controlling the 3 phases of the step motor 135 according to the motor commands. Optionally, sensors 434 may be implemented to measure the position and/or velocity of the motor 135 and provide that measurement as feedback to either the host 105, the motor control module 110a, or both. The sensors may also include Hall-effect sensors at the motor 135 to measure and report the position of the motor 135.

Figure 5:
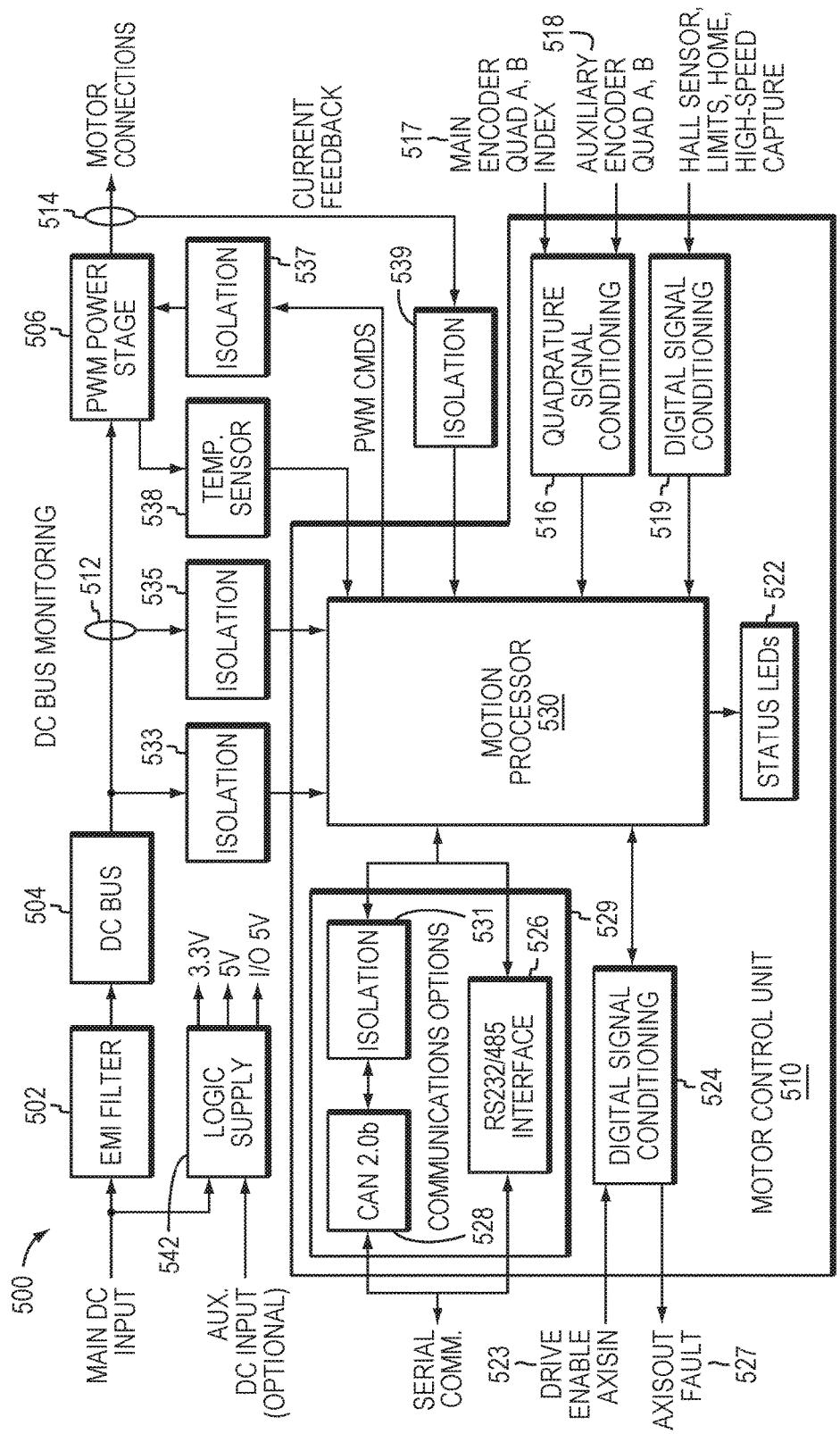
FIG. 5 is a block diagram illustrating elements of an example motor control unit that may be employed in the motor control systems of FIGS. 1 and 2.

FIG. 5 is a block diagram illustrating elements of an example motor control module 500 in a further embodiment. The motor control module 500 includes a motor control unit 510 and additional components connected to the unit 510 as described below. The motor control modules 110a-c described above may include one or more features of the module 500. In particular, the motor control units 210a-c may include one or more features of the motor control unit 510, and the digital amplifiers 220a-c and motor coil interfaces 225a-c may include one or more features of the components shown external to the motor control unit 510.

In some embodiments, some or all of the elements of the example motor control module 500 may be disposed on a PCI card or any other electronics package. The motor control module 500 includes a complete chip-based motion processor 530 that provides trajectory generation and related motion control functions. Depending on the type of motor to be controlled, the motion processor 530 provides servo loop closure, on-board commutation for brushless motors, and high-speed pulse and direction outputs. Thus, the dedicated motion processor 530 can support a large variety of system configurations including motors of different types.

The motion processor 530 architecture may include a high-speed computation unit (not shown) along with an Application Specific Integrated Circuit (ASIC) (not shown). The high-speed computation unit contains special on-board hardware that makes it well suited for the task of motion control. In single-axis/single-chip embodiments of the motion processor 530, the logic provided in the ASIC is integrated directly into the high-speed computation unit.

Embodiments of the motion processor 530 share a similar hardware architecture and most software commands. Therefore, software written for the motion processor 530 may be used with another motion processor, independent of the type of motor connected to the other motion processor or the hardware configuration of another motor control module.

The motion processor 530 may support DC brush, brushless DC, and step motors using both pulse and direction and microstepping output formats. For DC brush motors, brushless DC motors with external commutation, two-phase or three-phase Brushless DC motors, or step motors the motion processor 530 may provide an output in Pulse-width Modulation (PWM) or Digital-to-analog Converter (DAC)-compatible formats. For example, the motion processor 530 may provide PWM commands to a PWM Power Stage 506 via an electrical isolation unit 537. For pulse and direction step motors, the motion processor 530 may provide an output in a pulse and direction format.

The single-chip motion processor 530 may specifically be designed to provide one axis of control with an additional auxiliary axis of encoder input. The motion processor 530 may provide additional amplifier control features such as digital current control and over temperature sense.

In the motor control module 500, some or all of the connections to the motor control module 500 (such as encoder inputs and so forth) may be made available externally to the user while some may be connected to the internal module circuitry. But, regardless of the hardware configuration or motor type, the overall control approach is similar. Each motor axis inputs the actual location of the motor axis to the motion processor 530 using either incremental encoder signals from a relative or quadrature encoder or parallel-word encoder signals from an absolute encoder. Encoder signals may also come from an Analog-to-digital Converter (ADC), resolver, or laser interferometer.

The motion processor 530 includes a trajectory generator that calculates a new desired position of the motor axis at each cycle time interval, which is based on profile modes and parameters programmed by the host processor 105 (FIG. 1), as well as on the current state of the system. The cycle time is the rate at which major system parameters, such as trajectory, servo compensation, and other motion processor functions, are updated. Profile modes may include S-curve point-to-point (profile parameters include position, velocity, acceleration, deceleration, and jerk), trapezoidal point-to-point (profile parameters include position, velocity, acceleration, and deceleration), velocity-contouring (profile parameters include start velocity, velocity, acceleration, and deceleration), and electronic gearing using auxiliary differential encoder signals (Quad A, B) (profile parameters include direction and ratio of master axis gear counts to slave axis counts, master motor axis number, and master gear source).

For servo motors, the output of the trajectory generator is combined with the actual encoder position to calculate a 32-bit position error, which is passed through a Proportional-Integral-Derivative (PID) position loop. The motion processor 530 then provides resultant PWM or DAC signals to an external output power stage. For example, the motion processor 530 may provide PWM commands to the PWM Power Stage 506 via the electrical isolation unit 537. If the axis is configured for a brushless DC motor, then the signals output from the motion processor 530 are commutated; meaning the signals are combined with information about the motor phase angle to distribute the desired motor torque to two- or three-phased output commands.

If an axis of the motor control module 500 is configured for a DC brush servo motor, the single-phase motor command is output directly to the PWM power stage 506. If the motor control module 500 axes are configured for step motors, the motion processor 530 converts the output of the trajectory generator (not shown) to either microstepping signals, or pulse and direction signals, and provides these signals to the output power stage in either PWM or DAC format. The motor control module 500 may provide capabilities for digital current control or field oriented control, along with numerous monitoring and control features.

Communication to and from the motion processor 530 is accomplished using a communications unit 529. The communications unit 529 may include an RS232/485 serial interface 526 and a CAN 2.0b interface 528 for serial communications with an external processor through a data bus. The CAN 2.0b interface 528 may connect to the motion processor 530 through an electrical isolation unit 531. The communications unit 529 may also include a parallel-bus interface (not shown). The parallel-bus interface may provide for 8-bit wide data transfers or 16-bit wide data transfers, allowing a range of microprocessors and data buses to be interfaced. For serial communications, a user may select parameters such as baud rate, number of stop/start bits, and the transfer protocol. The transfer protocol may be either point-to-point (appropriate for single-motion processor systems), or multi-drop (appropriate for serial communications to multiple motion processors). For CAN communications, the user may select the desired CAN data bus rate and the CAN node address.

Regardless of the hardware interface method, communication to and from the motion processor 530 occurs using short commands sent or received as a sequence of bytes and words. These packets may contain an instruction code word that tells the motion processor 530 which operation is being requested. It may also contain data sent to, or received from, the motion processor 530. These commands are sent by the host processor 105 (FIG. 1) or host computer executing a supervisor program that provides overall system control. The motion processor 530 may be designed to function as the motion engine, managing high-speed dedicated motion functions such as trajectory generation or safety monitoring, while the host software program provides the overall motion sequences.

Electrical power, such as DC or AC power is provided to the motor control module 500 through an electromagnetic interference (EMI) filter 502 and a logic power supply 542. The motor control module 500 may include an auxiliary power input to the logic power supply 542. The logic power supply 542 provides power to the logic components in the motor control module 500. For example, the logic power supply 542 provides various voltage levels to the logic components of the motor control module 500, such as the motion processor 530, the communications unit 529, and the signal conditioning block 524. The EMI filter 502 filters electromagnetic interference from the input power and provides the filtered power to the PWM power stage 506 through a power bus, such as a DC power bus 504. The PWM powerstage 506, in turn, outputs power to drive a motor in accordance with commands from the motion processor 530. For example, the PWM power stage 506 may modulate power from the DC bus 504 according to PWM commands from the motion processor 530.

The voltage on the power bus 512 is monitored by the motion processor 530 through isolation units 533, 535. The motion processor 530 also monitors current 514 output by the PWM power stage 506 through electrical isolation unit 539. The temperature of the PWM power stage 506 through temperature sensor 538.

The motor control module 500 also includes a digital signal conditioning circuit 524 that receives various information from the Input/Output (I/O) pins of the motor control modules 500. Information received by the digital signal conditioning circuit 524 can includes data from Hall effect sensors and the limit switches, for example. The digital signal conditioning circuit 524 then provide this information in a format suitable for the motion processor 530. In further embodiments, the motor control module 500 may also receive motor feedback (e.g., encoder and/or Hall sensor feedback) to the motion processor 530, where the motion processor 530 generates the motor output commands as a function of the feedback.

In some embodiments, the motor control module 500 may include status LEDs 522 through which the motion processor 530 may provide status information. For example, the LEDs may be used to indicate various motor drive fault conditions. The motor control unit 510 may monitor various aspects of the motion of an axis. The motor control unit may include various numerical registers that may be queried to determine the current state of the motor control unit, such as the current actual position, the current commanded position, and so forth. In addition to these numerical registers, the motor control unit may include bit-oriented status registers that provide a continuous report on the state of a particular axis. These status registers combine a number of separate bit-oriented fields for a specified axis. In various embodiments of the status registers, the status registers is uniform across all motor types.

Figure 6:
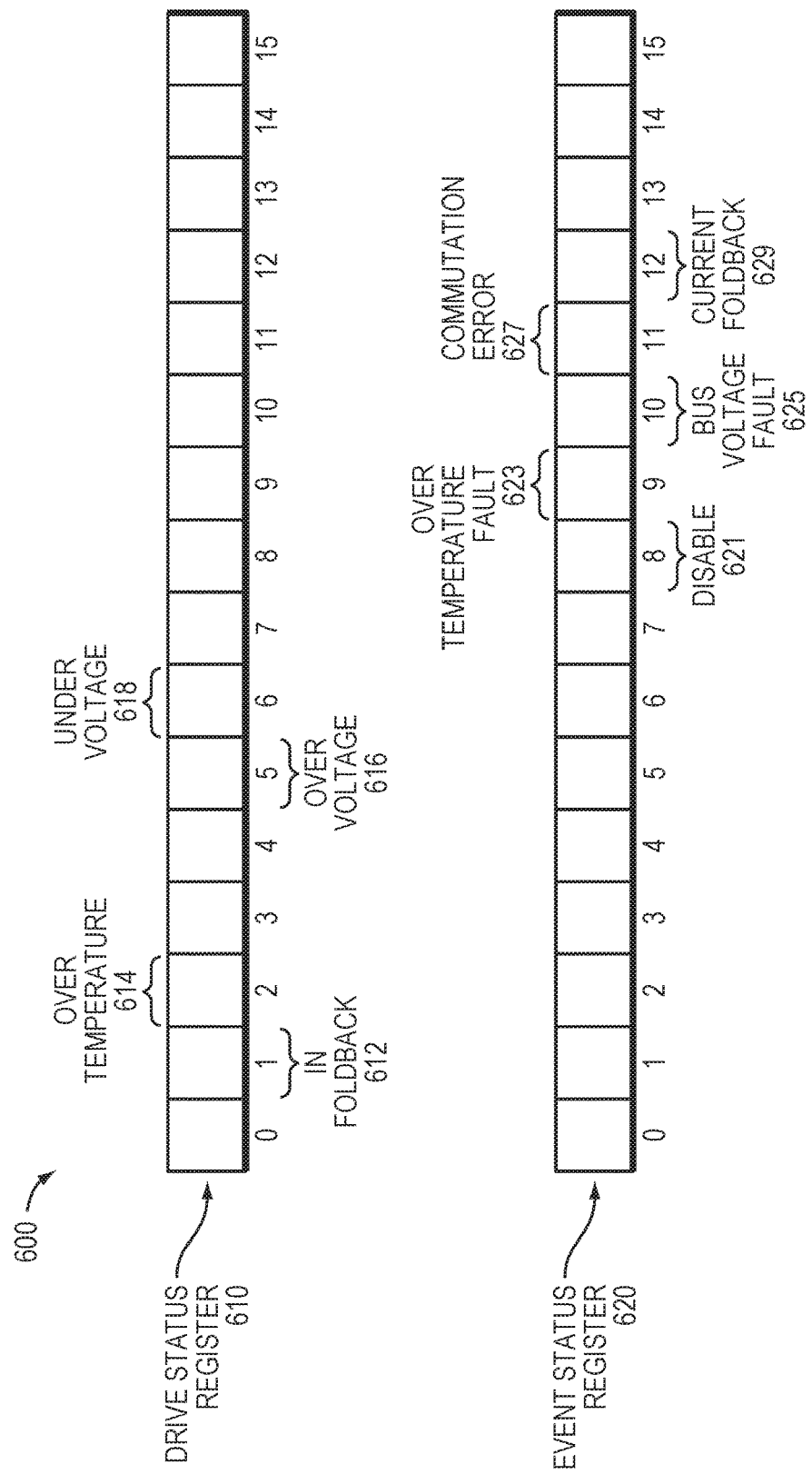
FIG. 6 is a diagram of example status registers employed in embodiments of motor control modules.

FIG. 6 is a diagram of example format of the status registers 600 that may be included in the banks of status registers 212a-c for the different motor types shown in FIG. 2. The banks of status registers 212a-c may include status registers having 16 one-bit fields. The status registers 600 may include an output power stage or drive status register 610 and an event status register 620. The Event Status register 620 records events that do not continuously change in value but rather tend to occur once due to a specific event. As such, each bit in this register is set by the motor control unit and cleared by the host processor. The banks of status registers 212a-c may also include an activity status register and a signal status register.

As shown in FIG. 6, the event status register 620 may include 16 one-bit fields which describe the status of various components or conditions of a motor control module. For example, a disable bit 621 may be set when the user or system operator disables the motor drive by making the enable signal 523 inactive (FIG. 5).

The host processor may issue a command to return the contents of the Event Status register for the specified axis. Bits in the Event Status register are latched. Once set, they remain set until cleared by a host processor instruction or a system reset. Event Status register bits may be reset to "0" using a 16-bit mask. For example, register bits corresponding to "0"s in the 16-bit mask are reset and all other bits are left unaffected.

The one-bit fields of the example Event Status register 620 are defined in the following table:

| Bit | Name | Description |
|---|---|---|
| 0 | Motion complete | Set when a trajectory profile completes. The motion being considered complete may be based on the commanded position, or the actual encoder position. |
| 1 | Position wraparound | Set when the actual motor position exceeds 7FFFFFFFh (the most positive position), and wraps to 80000000h (the most negative position), or vice versa. |
| 2 | Breakpoint 1 | Set when breakpoint #1 is triggered. |
| 3 | Capture received | Set when the high-speed position capture hardware acquires a new position value. |
| 4 | Motion error | Set when the actual position differs from the commanded position by an amount more than the specified maximum position error. The motion processor can be configured to stop motion automatically when this flag is set. |
| 5 | Positive limit | Set when a positive limit switch event occurs. |
| 6 | Negative limit | Set when a negative limit switch event occurs. |
| 7 | Instruction error | Set when an instruction error occurs. |
| 8 | Disable | Set when the user disables the controller by making the enable signal inactive. |
| 9 | Over temperature fault | Set when an over temperature fault occurs. |
| 10 | Bus voltage fault | Set when an over or under voltage fault occurs with the main supply bus voltage. |
| 11 | Commutation error | Set when a commutation error occurs. |
| 12 | Current foldback | Set when current foldback occurs. |
| 13 | Reserved | May contain "1" or "0". |
| 14 | Breakpoint 2 | Set when breakpoint #2 is triggered. |
| 15 | Reserved | May contain "0" or "1". |

Bits 8-12 (621-629) are of particular importance because they relate to safety features associated with a motor drive. A motor control processor (e.g., CPU 211a in FIG. 2) may set the disable bit 621 to "1" when a user or external hardware disables an associated motor drive (e.g., motor drive 225 in FIG. 2) by making the drive enable signal 523 (FIG. 5) inactive.

Once the user determines the reason for the drive enable signal 523 becoming inactive and makes appropriate corrections to maintain safe operating conditions of the motor drive and associated electronics, the disable bit 621 may be cleared (i.e., set to "0") by the user via the host processor. However, if the drive enable signal is still inactive while bit 8 of the Event Status register is being cleared, this bit will immediately be set again, and the recovery sequence must be executed again.

The motor control processor may set the overtemperature fault bit 623 to "1" when it determines that a motor drive temperature sensed by a temperature sensor (e.g., temperature sensor 538 in FIG. 5) exceeds a given temperature threshold indicating an over temperature fault. The overtemperature fault bit 623 may be cleared (i.e., set to "0") by the host processor if the motor control processor determines that the motor drive temperature no longer exceeds the given temperature threshold. The given temperature threshold may be programmable by a user but limited by a value less than or equal to the rated maximum for the motor driver.

Over temperature faults indicate that the internal safe limits of the drive temperature range have been exceeded.

This potentially serious condition can result from incorrect motor connections or from excessive torque demands placed on the motor drive. In addition to setting the over temperature fault bit 623, the motor control processor may also automatically disable the motor drive in response to the over temperature fault. After the user determines the reason for the fault and makes appropriate corrections, the user may clear the over temperature fault bit 623 of the Event Status register. If the over temperature fault condition still exists at the time the over temperature bit of the Event Status register is cleared, the over temperature bit will immediately be set again, and the user must again determine the reason for the fault and make appropriate corrections.

The motor control processor may set the bus voltage fault bit 625 to "1" when it reads a main supply bus voltage 512 (FIG. 5) provided to the motor drive and determines that it has passed a given voltage threshold. For example, the bus voltage fault bit 625 may be set to "1" when the main supply bus voltage dips below a first given voltage threshold (i.e., an under voltage fault) or exceeds a second given voltage threshold (i.e., an over voltage fault). An over voltage fault indicates that safe limits for the main supply bus voltage have been exceeded. This potentially serious condition can result from back-EMF generation due to high motor or machine inertia, or due to a failure of the main supply bus voltage. The motor control unit may also disable the motor drive in response to an over voltage fault.

After the user determines the reason for the fault and makes appropriate corrections, the bus voltage fault bit 625 may be cleared (i.e., set to "0") by the user through the host processor. The user may clear the bus voltage fault bit 625 so long as the motor control processor determines that the main supply bus voltage, for example, has returned to a level above the first given voltage threshold or below the second given threshold. If the fault condition still exists while the bus voltage fault bit 625 of the Event Status register 620 is being cleared, this bit may immediately be set again, and the user must again determine the reason for the fault and make appropriate corrections before attempting to clear the bus voltage fault bit 625.

The first given voltage threshold may be programmed by the user to have a value equal to or less than a prescribed maximum for the motor drive and the second given voltage threshold may have a value equal to or greater than a prescribed minimum for the motor drive.

A commutation error bit 627 may be set to "1" when a commutation error occurs, such as when the index pulse differs from the actual phase of the motor by greater than a given amount. The communtation bit 625 may be cleared (i.e., set to "0") by the host processor if the difference between the index pulse and the actual phase is less than the given amount.

A current fold-back bit 629 may be set to "1" when the motor control module goes into current foldback (also referred to as I²T foldback). Current foldback used to protect the motor drive or motor windings from excessive current that may generate excessive heat in the motor drive or motor windings. Current foldback may indicate a serious condition effecting motion stability, smoothness, and performance. The motor control module enters current foldback when the square of the actual motor current (e.g., current feedback 514) that is in excess of a given maximum continuous current, integrated over time, is greater than zero. For example, in one embodiment, when this integrated value reaches the equivalent of two seconds at the given maximum continuous current, the motor control module may go into current foldback. While in current foldback, the actual motor current is clamped to the given maximum continuous current. The motor control module then remains in current foldback until the integrated value returns to zero. If the integrated value returns to zero, the current foldback bit 629 may be cleared (i.e., set to "0") by the user.

The given maximum continuous current value may be programmed by the user to a value less than the maximum continuous current supported by the motor drive. This is useful if the required current limit is due to the motor, rather than the motor drive.

The Activity Status register (not shown), like the Event Status register, tracks various aspects of the motor control module. The Activity Status register bits, however, are not latched, but they are continuously set and reset by the motor control processor to indicate the status of various aspects of the motor control module.

The Drive Status register 610 functions similarly to the Activity Status register in that it continuously tracks various aspects of the motor control module. In other words, the Drive Status register bits are not latched; they are continuously set and reset by the motor control processor to indicate the status of the motor control module. The specific status bits provided by the Drive Status register are defined in the following table:

| Bit | Name | Description |
|---|---|---|
| 0 | Reserved | May contain 0 or 1. |
| 1 | In foldback | Set ("1") when not in foldback, cleared ("0") if in foldback. |
| 2 | Over temperature | Set ("1") when the axis is currently in an over temperature condition. Cleared ("0") if the axis is currently not in an over temperature condition. |
| 3 | Reserved | May contain "0" or "1". |
| 4 | In holding | Set ("1") when the axis is in a holding current condition, cleared ("0") if not. |
| 5 | Over voltage | Set ("1") when the axis is currently in an over voltage condition. Cleared ("0") if the axis is currently not in an over voltage condition. |
| 6 | Under voltage | Set ("1") when the axis is currently in an under voltage condition. Cleared ("0") if the axis is currently not in an under voltage condition. |
| 7-15 | Reserved | May contain "0" or "1". |

As indicated in the table above, the motor control processor may set an in foldback bit 612 to either "1" or "0" depending on whether or not the motor control module goes into or comes out of current foldback. In a similar manner, an overtemperature bit 614 may be set to either "1" or "0" depending on whether the motor control processor determines that the motor drive exceeds a given temperature. The motor control processor may set an over-voltage bit 616 to "1" when it determines that the main supply bus voltage 512 (FIG. 5) provided to the motor drive goes below a given lower voltage level. The motor control processor may then clear bit 616 (i.e., set the over voltage bit 616 to "0") when the main supply bus voltage exceeds the given lower voltage level.

The motor control processor may set an under voltage bit 618 to "1" when it determines that the main supply bus voltage 512 (FIG. 5) provided to the motor drive exceeds a given upper voltage level. The motor control processor may then clear the undervoltage bit 618 (i.e., set the undervoltage bit 618 to "0") when the main supply bus voltage goes below the given upper voltage level. Other bits may be set to describe the status of the motor drive or other components of the motor control module. Depending on the application, when bits 1-2 and 5-6 are set to "1", it may be necessary to power down the system and check for proper operation or service.

The Signal Status register provides real-time signal levels for various motion processor I/O pins. The Signal Status register is defined in the following table:

| Bit | Name | Description |
| --- | --- | --- |
| 0 | A encoder | A signal of quadrature encoder input. |
| 1 | B encoder | B signal of quadrature encoder input |
| 2 | Index encoder | Index signal of quadrature encoder input. |
| 3 | Home/capture | This bit holds the home signal, the HighSpeedCapture signal, or the Index signal, depending on which was set as the high speed capture. |
| 4 | Positive limit | Positive limit switch input. |
| 5 | Negative limit | Negative limit switch input. |
| 6 | Axisin | Generic axis input signal. |
| 7 | Hall1 | Hall effect sensor input number 1. |
| 8 | Hall2 | Hall effect sensor input number 2. |
| 9 | Hall3 | Hall effect sensor input number 3. |
| 10 | AxisOut | Programmable axis output signal. |
| 11-12 | Reserved | May contain "0" or "1". |
| 13 | Enable | Enable signal input. |
| 14 | Fault | Fault signal output. |
| 15 | Reserved | May contain "0" or "1". |

All Signal Status register bits are inputs except bit 10 (AxisOut) and bit 14 (Fault). The bits in the Signal Status register represent the actual hardware signal level combined with the state of a signal sense mask. That is, if the signal level at the motion processor is high, and the corresponding signal mask bit is 0 (do not invert), then the bit read will be "1". Conversely, if the signal mask for that bit is "1" (invert), then a high signal on the pin will result in a read of "0".

The motor control modules may provide a programmable mechanism for reacting to various safety or performance-related conditions. A command, such as SetEventAction, may be used to specify what action should be taken for a given condition. To define an event-related response, both a condition and an action must be specified. The following table lists example Event Status register conditions that can be used to define an event-related action:

| Condition Name | Description |
| --- | --- |
| Motion error | A motion error occurs when the position error exceeds a programmable threshold. |
| Positive limit input | A positive limit event occurs when the corresponding signal input goes active. |
| Negative limit input | A negative limit event occurs when the corresponding signal input goes active. |
| Current foldback | A current foldback event occurs when the motor drive current output goes into a foldback condition. |

The following table describes the actions that can be programmed for these conditions:

| Condition Name | Description |
| --- | --- |
| No action | No action taken |
| Smooth stop | Causes a smooth stop to occur at the current active deceleration rate. The velocity command will be set to zero after event action occurs. |
| Abrupt stop | Causes an instantaneous halt of the trajectory generator. The velocity command will be set to zero ("0") after event action occurs. |
| Abrupt stop with position error clear | Causes an instantaneous halt of the trajectory generator as well as a zeroing of the position error (equivalent to ClearPositionError command). The velocity command will be set to zero ("0") after event action occurs. |
| Disable position loop & higher modules | Disables trajectory generator and position loop module. |
| Disable current loop & higher modules | Disables trajectory generator, position loop, and current loop modules. |
| Disable motor output & higher modules | Disables trajectory generator, position loop, current loop, and motor output modules. |

Once the event condition is programmed, the motor control unit monitors the specified condition continuously and executes the programmed action if it occurs. Upon occurrence, the programmed action is executed, and related actions may occur such as setting the appropriate bit in the Event Status register.

To recover from an event action, a command, such as RestoreOperatingMode, may be used to reset the motor control unit to a previously specified operating mode. However, if the event condition still exists, then the event action may reoccur.

Once programmed, an event action may be in place until reprogrammed. Thus, the occurrence of the event condition may not reset the programmed event action.

Default values may be provided for event-related processing. These defaults may provide safe operation for many typical motion systems. Example default event actions are summarized in the following table:

| Condition | Default Action |
| --- | --- |
| Motion error | Disable position loop and trajectory generator. |
| Positive & Negative Limit | Abrupt stop with position error clear. |
| Current foldback | Disable motor output and higher modules. |

In addition to profiling, servo control, and other standard motion control functions, the motor control module 500 may provide digital current control and digital drive control features for motors of different types using a uniform protocol. Digital current control is a technique that may be used for DC brush, brushless DC, and step motors for controlling the current through each winding or coil of the motor. By controlling the current through the windings of the motor, response times improve and motor efficiency can be increased.

Figure 7:
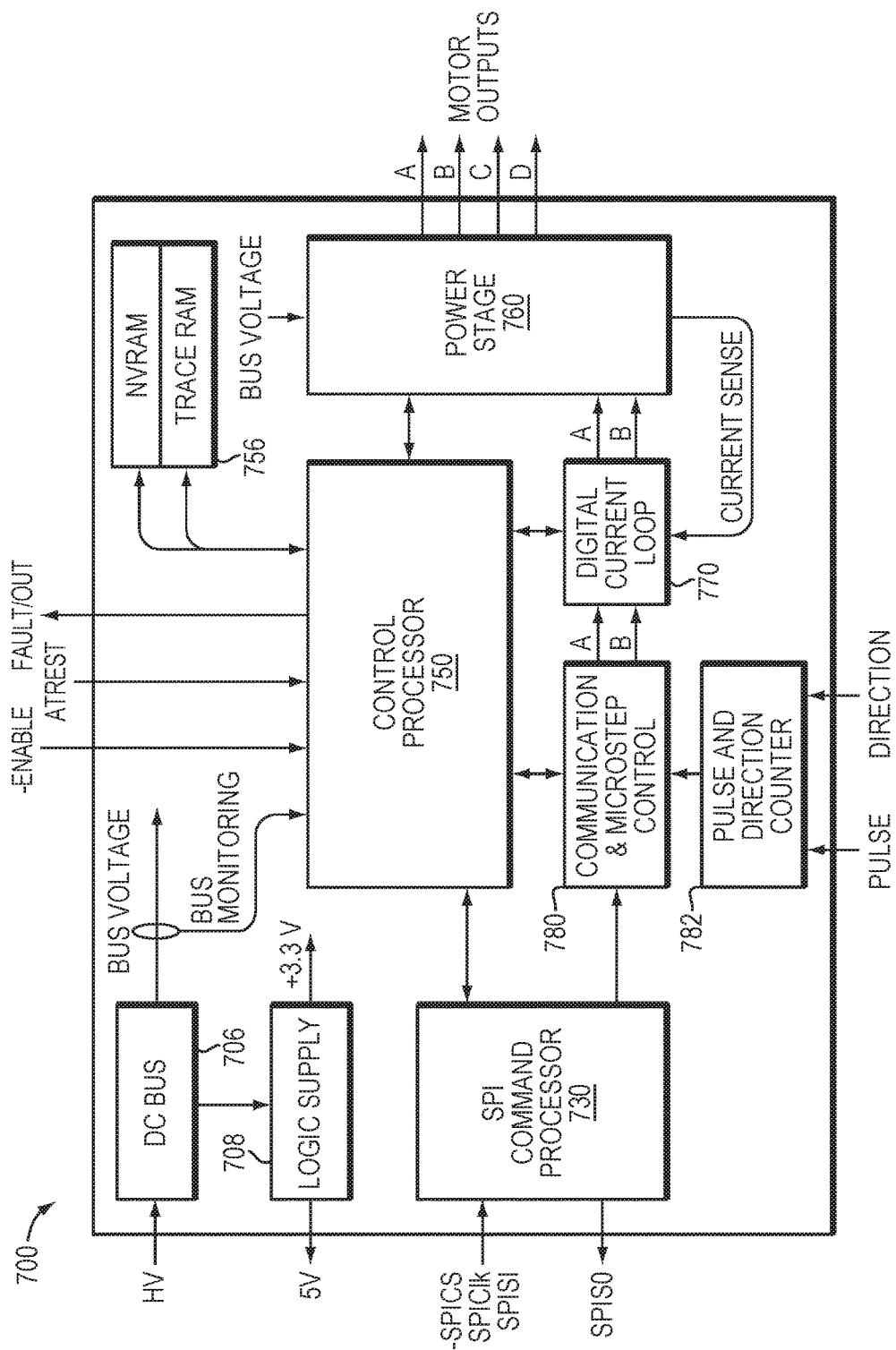
FIG. 7 is a block diagram of a motor control module in a further embodiment.

FIG. 7 is a block diagram of a motor control module 700 in a further embodiment. The motor control module 700 includes a SPI command processor 730, control processor 750, power stage 760, and additional components connected to those components as described below. The motor control modules 110*a-c* described above may include one or more features of the module 500. For example, the motor control units 210*a-c* may include one or more features of the SPI command processor 730, and the digital amplifiers 220*a-c* may include one or more features of the control processor 750, the power stage 760, and other components of the control module 700.

The SPI command processor 730 manages communications to and from an external controller (e.g., the host 105 of FIG. 1), and may include features of the motor control units 210*a-c* described above. A DC bus 706 generates a bus voltage for the power stage 760, and a logic supply 708 provides a voltage source for the logic circuitry (e.g., SPI command processor 730, control processor 750, etc.). A commutation block 780 utilizes internally and/or externally generated information (e.g., via a pulse and direction counter 782) to divide an overall torque command into individual phase commands to drive suitable motors, such as brushless DC and step motors. A current loop 770 receives the desired current for each motor coil and uses the measured current feedback from each motor coil (via the power stage 760) to develop PWM (pulse width modulation) output command values for the power stage 770. The current loop 770 may be disabled when driving the motor in a voltage mode. An example current module is described in further detail below with reference to FIG. 8.

The control processor 750 may communicate with the SPI command processor 730, commutation block 780 and current loop 770 to manage generation of the motor output signals A-D at the power stage 760. The control processor 750 and power stage 760 may include features of the controller 250 and power stage 260 of the digital amplifier 220*a* described above with reference to FIG. 3A. Likewise, the digital amplifier 220*a* may include features of the commutation block 780, current loop 770, and other components of the motor control module 700. The memory 756 may store a motor type register and other information, such as the status registers described above, trace and setup parameter configuration, initial setup parameters, and trace memory.

During initial setup, the SPI command processor may receive an indication of a selected motor type from a host processor (e.g., host 105 of FIG. 2), and may forward a corresponding command signal to the control processor 750. In response to the command signal, the control processor may access a memory 756 to update a motor type register and retrieve an excitation table and other parameters corresponding to the motor type. Based on this information, the control processor 750 may program or configure the commutation block 780, current loop 770 and power stage 760 to drive the selected motor type. For example, the control processor 750 may 1) selectively enable and program the commutation block 780, 2) program the current loop 770 with an excitation table corresponding to the selected motor type, and 3) enable and disable the motor outputs A-D at the power stage 760. If the motor control module 700 is later employed to drive a motor of a different type, then the configuration process may be repeated to accommodate the subsequent motor, and the motor type register at the memory 756 may be updated accordingly.

Figure 8:
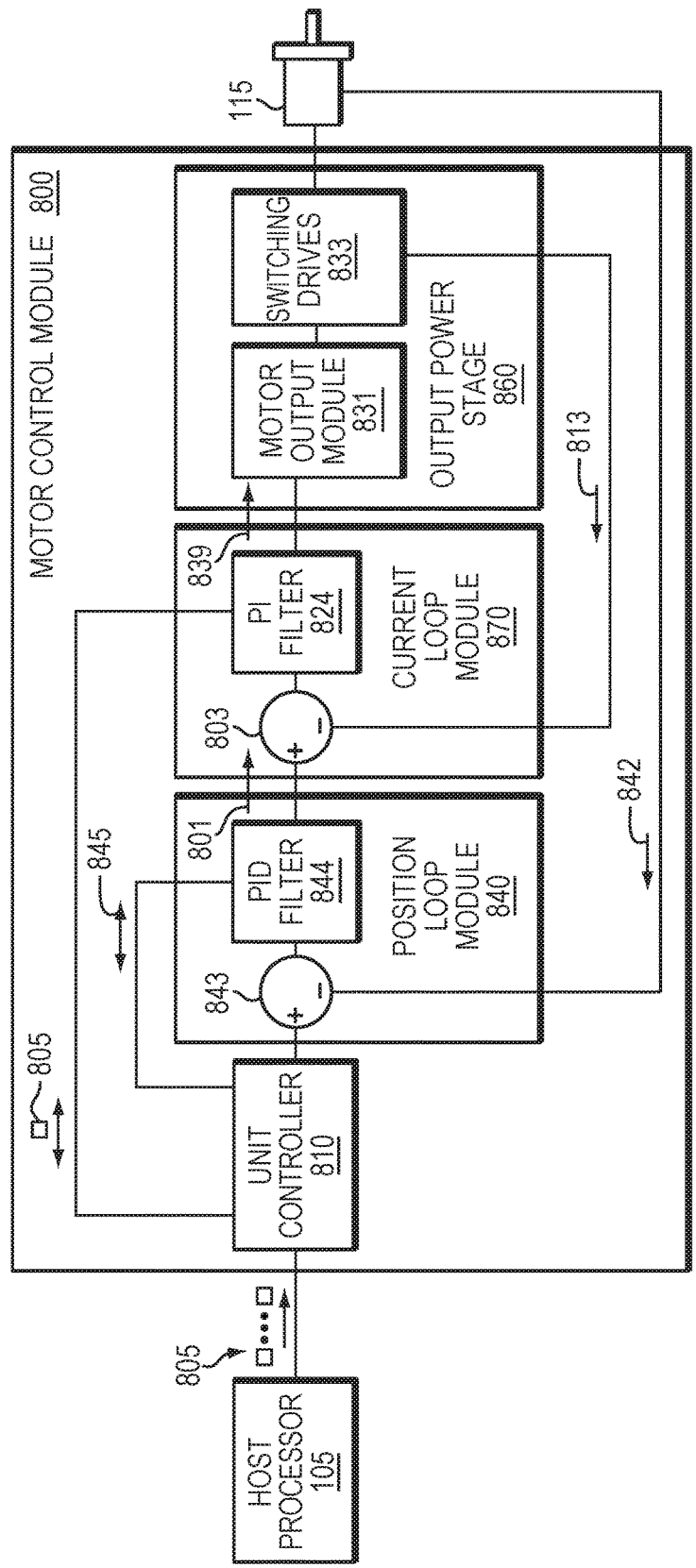
FIG. 8 is a block diagram of a motor control module illustrating example control elements.

FIG. 8 is a block diagram of a motor control module 800 illustrating example control elements in a further embodiment. The motor control module 800 is shown in abbreviated form to illustrate the control elements, and may also include features of the motor control modules 110*a* and 700 described above with reference to FIGS. 3A and 7. The motor control module 800 includes motor control unit 810 configured to communicate with a host 105, and optionally may employ a position loop module 840 and a current loop module 870 to generate corresponding signals for output at the output power stage 860. The current control loop module 870 may include one or more current control loops depending on the number of windings in the motor being controlled. The parameters and variables of the current control loops may be the same regardless of the motor type being controlled. The output power stage 860 includes a motor output modules 831 and switching drives 833. The motor output module 831 may include motor output logic (not shown) that generates the precise PWM timing outputs signals for the switching drive 833.

The optional position loop module 840 may be included if the motor control module 800 (rather than the host 105) receives encoder feedback signal 842, and provides a feedback loop from the motors 115. It compares the commanded motor position and the actual motor position, as received from the unit controller 810 and motor 115, respectively. Based on this comparison, it passes a resultant position error to a proportional-integral-derivative (PID) filter 844 to generate a motor command. The position loop module 840 receives, from the motor unit controller 810, a control signal to the comparator 843 indicating a target position. The comparator 843 compares this value to the encoder feedback signal 842 provided by the motor 115, and outputs the comparison to the PID filter 844. The PID filter 844 also receives a signal 845 from the unit controller 810 indicating the target velocity, and applies a PID algorithm to calculate an appropriate output. Thus, the position loop module 840 provides a current 801 derived from the unit controller 810 control and encoder feedback from the motor 115. In some embodiments, such as those wherein the module 800 does not receive a feedback signal from the motor 115, the position loop module 840 may be disabled or omitted. In such a case, the unit controller 810 may bypass position loop module 840, forwarding the current to the current loop module 870. For example, a position loop 840 may be disabled when the motor control module 800 controls a stepping motor.

The current loop module 870 receives a desired current 801 for each motor winding from the position loop modules 840 and an actual measured current 813 for each motor winding from the switching drive 833. The desired current 801 is fed to a subtraction block 803 in which the desired current 801 and respective actual measured current 813 is subtracted to develop respective current errors. The current errors are then passed through a proportional-integral (PI) filters 824 to generate output voltages 839 for each motor winding.

During initial setup, the unit controller 810 may receive an indication of a selected motor type from host 105, and may program or configure the position loop module 840, the current loop 870, and output power stage 860 to drive the selected motor type. For example, the unit controller 810 may 1) selectively enable and program the position loop module 840, 2) program the current loop module 870 with an excitation table corresponding to the selected motor type, and 3) enable and disable the motor outputs at the power stage 760. Example excitation tables are described in further detail below with reference to FIGS. 10A-C.

Figure 9A:
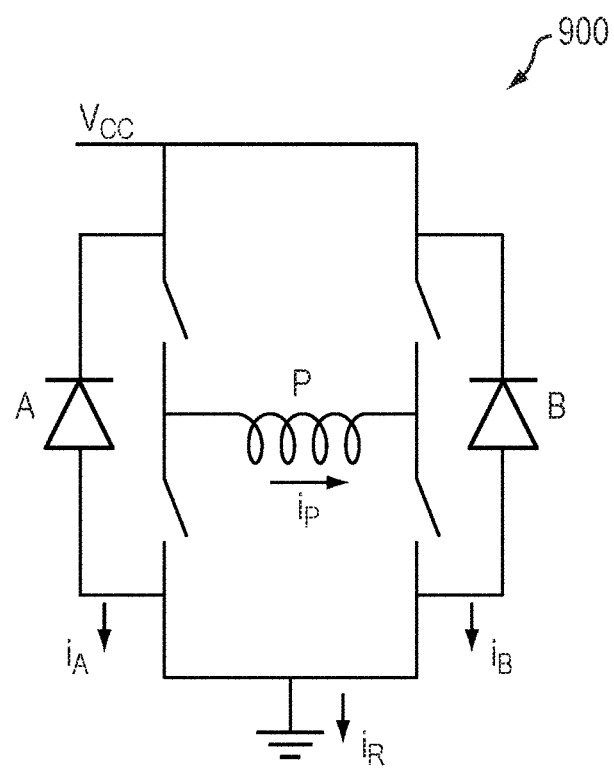
FIG. 9A is a diagram of a circuit connecting a motor control module and a motor.
Figures 9B, 9C:
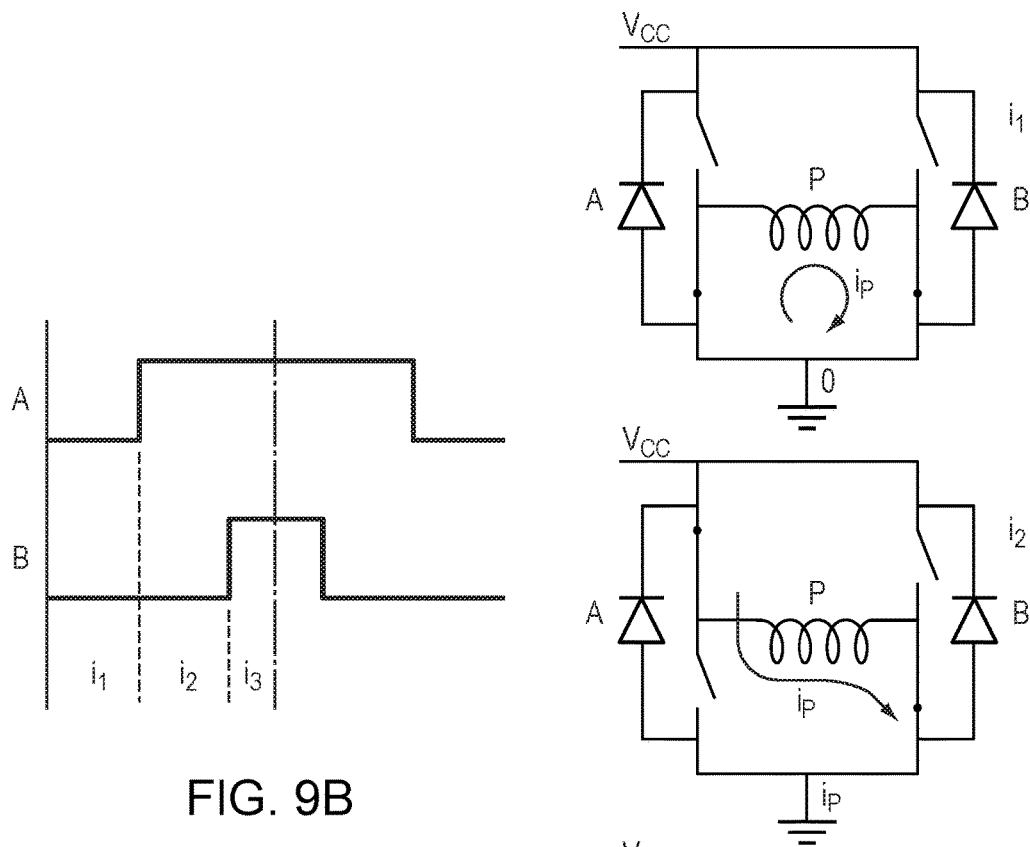
FIG. 9B is a timing diagram illustrating current through the circuit of FIG. 9A.
FIG. 9C illustrate the circuit of FIG. 9A at each state of the timing diagram of FIG. 9B.

FIGS. 9A-C illustrate a circuit connection between a motor control module and a motor, as well as a process for calculation of a bus return current for a motor, in an example embodiment. Previous motor controllers, which are limited to controlling a single motor type, have computed a bus return current based on the computed phase currents of each motor phase. The fraction of time each phase current is flowing to ground could be determined, and then those fractions could be multiplied and summed to determine the bus return current. In contrast, example embodiments may implement a process for determining bus return current that can be used uniformly for different motor types. In particular, each motor output leg current may be measured and then multiplied by the fraction of time the corresponding lower switch is closed, using a zero value for terminals not used. All four legs may then be summed to determine the bus return current for the motor. This process is described in further detail below with reference to FIGS. 9A-C, and may be employed by the motor control modules 110a-c, 700, 800 described above to determine the bus current of a connected motor.

FIG. 9A is a circuit schematic of a one-phase motor (having a motor coil represented by inductor P) configured for driving by a motor control module. Vcc is the bus supply voltage, $i_p$ the phase current, $i_A$ and $i_B$ the measured lower leg currents, and $i_R$ the bus return current, which is the current to be computed. In example embodiments, the phase current $i_p$ is computed as either $-i_A$ or $i_B$, depending on which lower leg switch has a longer on time. As shown, it is $-i_A$.

FIG. 9B illustrates a timing diagram for switches A and B. A "high" signal indicates that the high-side switch is closed, while a "low" indicates that the low-side switch is closed. FIG. 9C illustrates the flow of current during the three states shown in FIG. 9B. The value ip may be substantially constant, except for low motor commands, due to the inductance of the coil. The value $i_R$, the quantity to be measured, varies: the net current is zero during $t_1$, is equal to $i_p$ during $t_2$, and is zero during $t_3$.

Averaged over a PWM cycle, the bus return current is given by:

$$i_R = \frac{i_p t_2}{t_1 + t_2 + t_3}$$

The above process may be applied to multi-phase motors. Further, the bus return current can also be computed by multiplying each (signed) lower leg current by the fractional time the lower switch is closed, and summing each result to determine the total bus return current:

$$i_R = \frac{i_A t_1}{t_1 + t_2 + t_3} + \frac{i_B(t_1 + t_2)}{t_1 + t_2 + t_3}$$

The above calculation can be extended this to four or more terminals, using a value of zero for the lower switch time of any unused terminals. As a result, the process for determining bus return current may be applied, without modification, to different motors including one, two, and three-phase motors.

FIGS. 10A-C are example excitation tables 1001-1003 for controlling different motor types. The excitation tables 1001-1003 each provide parameters for controlling a motor of a given type. With reference to the motor control module 700 described above, the excitation tables 1001-1003 may be stored to the memory 756. During setup for a selected motor type, the control processor may retrieve the corresponding excitation table from the memory 756 and configure the module 700 for operation according to the excitation table. For example, the control processor 750 may program the current loop 770 based on the excitation table, and may configure operation of the switches at the power stage 760 based on the excitation table.

FIG. 10A illustrates an excitation table 1001 for a DC brush motor, such as the DC brush motor 125 described above. Due to the relatively simple operation of a single-phase DC brush motor, the excitation table 1001 indicates two switch states and current input for positive and negative commands.

FIG. 10B illustrates an excitation table 1002 for a 3-phase brushless DC motor, such as the brushless DC motor 135 described above. The excitation table 1002 indicates measured Hall states and corresponding phase angles in six steps, and further indicates switch states and current input at each of the six steps. As a result, the motor control module can provide a six-step Hall-based commutation for brushless DC motors.

FIG. 10C illustrates an excitation table 1003 for a 2-phase step motor, such as the step motor 115 described above. The excitation table 1003 indicates measured phase angles at 45-degree intervals, and further indicates switch states and current input at each of the intervals. As a result, the motor control module can provide half-step control for step motors.

Figure 11:
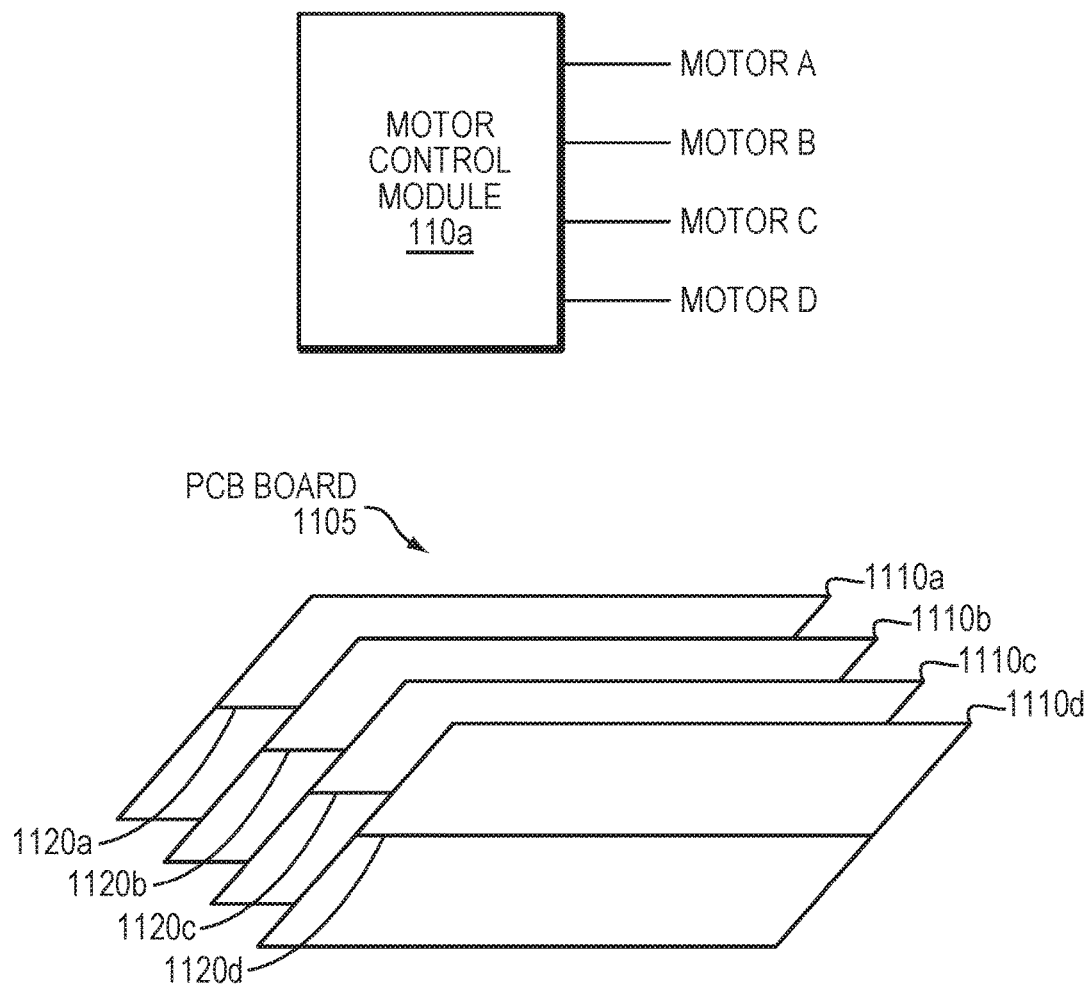
FIG. 11 illustrates a PCB board integrating traces for the outputs of a motor control module in an example embodiment.

FIG. 11 illustrates a PCB board 1105 integrating traces 1120a-d for the outputs of a motor control module 110a in an example embodiment. As described above, the motor control module 110a provides motor outputs A-D to drive motors of a range of different motor types. Those outputs may be embodied as physical wire traces that extend through respective layers 1110a-c of the PCB board. Due to the range of potential output signals resulting from operation with different motor types, there is the potential for the traces of the motor outputs to exhibit electromagnetic interference (EMI). To minimize EMI, the traces 1120a-d may be positioned in close proximity to one another. For example, the traces 1120a-d may be positioned on top of one another in subsequent layers 1110a-d of the PCB board 1105, and run in parallel to one another as shown in FIG. 11. Alternatively, some or all of the traces 1120a-d may occupy a common PCB layer, and may be positioned in close proximity to one another within the common PCB layer.

While example embodiments have been particularly shown and described, it will be understood by those skilled in the art that various changes in form and details may be made therein without departing from the scope of the embodiments encompassed by the appended claims.

What is claimed is:
1. A motor control module, comprising:
a digital amplifier configured to drive a plurality of different motor types;
a motor control unit coupled to the digital amplifier, the motor control unit configured to select a motor type driven by the digital amplifier via a command signal to the digital amplifier, the motor control unit monitoring status information about the motor control module including status information about the digital amplifier; and
a motor coil interface coupled to the digital amplifier, the motor coil interface configured to connect with the plurality of different motor types;
wherein the motor control unit is configured to forward motor control commands to the digital amplifier, the motor control commands having a format independent of motor type, the digital amplifier being further configured to control a motor of the selected motor type based on the motor control commands.

2. The module of claim 1, wherein the plurality of different motor types include at least two of a 1-phase motor, a 2-phase motor, and a 3-phase motor.

3. The module of claim 1, wherein the digital amplifier is further configured to selectively enable and disable at least one output to the motor coil interface based on the motor type.

4. The module of claim 1, wherein the digital amplifier includes a set of traces extending to the motor coil interface, the set of traces configured to carry drive signals for the plurality of different motor types, the set of traces being aligned in a common path and positioned within a proximity causing a reduction in electromagnetic interference.

5. The module of claim 1, wherein the plurality of different motor types include at least two of a 1-phase DC Brush motor, a 3-phase brushless DC motor, a 2-phase step motor, a piezo motor, a voice coil, a solenoid, and an AC induction motor.

6. The module of claim 1, further comprising a motor type register accessible by the digital amplifier, the motor type register being configured to store an indication of the motor type.

7. The module of claim 1, further comprising status registers coupled to the motor control unit, the status registers having a format independent of motor type, the motor control unit configured to update the status information in the status registers.

8. The module of claim 7, wherein the status registers include a drive status register, the drive status register indicating the status information about the digital amplifier.

9. The module of claim 7, wherein the status information about the digital amplifier includes a voltage input to the digital amplifier, temperature of the digital amplifier, and current output by the digital amplifier.

10. The module of claim 7, wherein the status information includes status information about a current control loop coupled to the digital amplifier.

11. The module of claim 10, wherein the status information about the current control loop includes a commanded current, measured current, difference between the commanded and measured currents, sum of an integrator of the current control loop, overall contribution of the integrator, and output command for the current control loop.

12. The module of claim 7, wherein the status registers include an event status register, activity status register, and signal status register.

13. The module according to claim 7, wherein the motor control unit further includes a processing unit coupled to the digital amplifier and the status registers, the processing unit configured to update the status registers.

14. The module of claim 7, wherein the status registers include an event status register, the motor control unit configured to clear at least one bit in the event status register based on a message from a host processor in communication with the motor control module.

15. The module of claim 1, wherein the digital amplifier is further configured to generate a pulse-width modulation (PWM) signal to the motor coil interface, the digital amplifier controlling a duty cycle of the PWM signal based on a motor control command received from the motor control unit.

16. A motor control module, comprising:
a digital amplifier configured to drive a plurality of different motor types;
a motor control unit coupled to the digital amplifier, the motor control unit configured to select a motor type driven by the digital amplifier via a command signal to the digital amplifier, the motor control unit monitoring status information about the motor control module including status information about the digital amplifier; and
a motor coil interface coupled to the digital amplifier, the motor coil interface configured to connect with the plurality of different motor types;
wherein the motor coil interface is configured to connect with the plurality of different motor types via at least one common port.

17. A motor control module, comprising:
a digital amplifier configured to drive a plurality of different motor types;
a motor control unit coupled to the digital amplifier, the motor control unit configured to select a motor type driven by the digital amplifier via a command signal to the digital amplifier, the motor control unit monitoring status information about the motor control module including status information about the digital amplifier; and
a motor coil interface coupled to the digital amplifier, the motor coil interface configured to connect with the plurality of different motor types;
wherein the digital amplifier includes a current loop, the current loop being reconfigurable as a function of the motor type.

18. The module of claim 17, wherein the current loop is reconfigured via an excitation table.

19. The module of claim 18, wherein the excitation table is stored at the digital amplifier.

20. The module of claim 18, wherein at least one of the digital amplifier and motor control unit is configured to modify the excitation table via a programming signal received from a host.

21. The module of claim 17, wherein the current loop is configured to calculate a return current from the motor via a process common to the plurality of different motor types.

22. A method of controlling a motor, comprising:
selecting a motor type driven by a digital amplifier via a command signal to the digital amplifier, the digital amplifier configured to drive a plurality of different motor types;
configuring the digital amplifier to drive a motor of the motor type in accordance with the command signal;
monitoring, via a motor control unit, status information about a motor control module including status information about the digital amplifier;
driving the motor via a motor coil interface coupled to the digital amplifier, the motor coil interface configured to connect with the plurality of different motor types;
forwarding, via the motor control unit, motor control commands to the digital amplifier, the motor control commands having a format independent of motor type; and
controlling a motor of the selected motor type based on the motor control commands.

23. The method of claim 22, wherein the plurality of different motor types include at least two of a 1-phase motor, a 2-phase motor, and a 3-phase motor.

24. The method of claim 22, wherein the motor coil interface is configured to connect with the plurality of different motor types via at least one common port.

25. The method of claim 22, further comprising selectively enabling and disabling at least one output to the motor coil interface based on the motor type.

26. The method of claim 22, wherein the digital amplifier includes a current loop, the current loop being reconfigurable as a function of the motor type.

27. The method of claim 26, further comprising reconfiguring the current loop via an excitation table.

28. The method of claim 27, further comprising storing the excitation table at the digital amplifier.

29. The method of claim 27, further comprising modifying the excitation table via a programming signal received from a host.

30. The method of claim 26, further comprising calculating, via the current loop, a return current from the motor via a process common to the plurality of different motor types.

31. The method of claim 22, wherein the plurality of different motor types include at least two of a 1-phase DC Brush motor, a 3-phase brushless DC motor, a 2-phase step motor, a piezo motor, a voice coil, a solenoid, and an AC induction motor.

32. A motor control system, comprising:
a motor control data bus for carrying motor information; and
plural motor control modules coupled to the motor control data bus, each motor control module including:
a digital amplifier configured to drive a plurality of different motor types;
a motor control unit coupled to the digital amplifier, the motor control unit configured to select a motor type driven by the digital amplifier via a command signal to the digital amplifier, the motor control unit monitoring status information about the motor control module including status information about the digital amplifier; and
a motor coil interface coupled to the digital amplifier, the motor coil interface configured to connect with the plurality of different motor types
wherein the motor control unit is configured to forward motor control commands to the digital amplifier, the motor control commands having a format independent of motor type, the digital amplifier being further configured to control a motor of the selected motor type based on the motor control commands.

33. The motor control system according to claim 32, further comprising a host controller coupled to the plural motor control modules via the motor control data bus, the host controller configured to retrieve the common status information by sending a message to the plural motor control modules.

34. A motor control device, comprising:
a digital amplifier configured to drive a plurality of different motor types, the digital amplifier further configured, in response to a command signal received from a motor control unit indicating a selected motor type, to enter a mode of operation corresponding to the selected motor type, the mode of operation being one of plural modes of operation each corresponding to a different motor type; and
a motor coil interface coupled to the digital amplifier, the motor coil interface configured to connect with the plurality of different motor types, the digital amplifier reconfiguring outputs of the motor coil interface based on the mode of operation;
wherein the digital amplifier is further configured to receive motor control commands from the motor control unit, the motor control commands having a format independent of motor type, the digital amplifier being further configured to control a motor of the selected motor type based on the motor control commands.

* * * * *